US011563663B2

(12) United States Patent
Cimino et al.

(10) Patent No.: US 11,563,663 B2
(45) Date of Patent: *Jan. 24, 2023

(54) METHODS AND APPARATUS TO CREDIT BACKGROUND APPLICATIONS

(71) Applicant: The Nielsen Company (US), LLC, New York, NY (US)

(72) Inventors: Susan Cimino, Odessa, FL (US); Achilleas Papakostas, Dallas, TX (US); Cary Pillers, Richardson, TX (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/365,904

(22) Filed: Jul. 1, 2021

(65) Prior Publication Data

US 2021/0328896 A1  Oct. 21, 2021

Related U.S. Application Data

(63) Continuation of application No. 16/532,108, filed on Aug. 5, 2019, now Pat. No. 11,057,286, which is a
(Continued)

(51) Int. Cl.
*G06F 15/173* (2006.01)
*H04L 43/0876* (2022.01)
(Continued)

(52) U.S. Cl.
CPC ........ *H04L 43/0876* (2013.01); *G06F 9/4843* (2013.01); *H04L 43/16* (2013.01);
(Continued)

(58) Field of Classification Search
None
See application file for complete search history.

(56) References Cited

U.S. PATENT DOCUMENTS 6,978,303 B1   12/2005   McCreesh et al.
7,523,191 B1   4/2009   Thomas et al.
(Continued)

OTHER PUBLICATIONS

United States Patent and Trademark Office, "Notice of Allowance," mailed in connection with U.S. Appl. No. 14/503,017, dated Apr. 21, 2017, 7 pages.
(Continued)

*Primary Examiner* — Phuoc H Nguyen
(74) *Attorney, Agent, or Firm* — Hanley, Flight & Zimmerman, LLC

(57) ABSTRACT

Examples disclosed herein include means for comparing bandwidth usage of an application executing in a background of a device to a threshold to determine a state of the application as one of active or inactive, means for logging event records associated with the application, and means for crediting a duration of background execution of the application. In disclosed examples, the means for crediting is to determine whether the bandwidth usage pattern is spiked or continuous based on a first event record representative of background execution of the application being started, update a second event record to be representative of the background execution of the application being stopped when the bandwidth usage pattern is spiked and a timestamp of the second event record exceeds a temporal activity window, and determine the duration of the background execution of the application based on the first event record and the second event record.

20 Claims, 11 Drawing Sheets

Related U.S. Application Data continuation of application No. 15/676,191, filed on Aug. 14, 2017, now Pat. No. 10,374,927, which is a continuation of application No. 14/503,017, filed on Sep. 30, 2014, now Pat. No. 9,749,209.

(60) Provisional application No. 61/899,007, filed on Nov. 1, 2013.

(51) Int. Cl.
  *H04L 43/16* (2022.01)
  *H04L 67/125* (2022.01)
  *G06F 9/48* (2006.01)
  *H04L 43/106* (2022.01)

(52) U.S. Cl.
  CPC .......... *H04L 67/125* (2013.01); *H04L 43/106* (2013.01); *Y02D 10/00* (2018.01)

(56) References Cited

U.S. PATENT DOCUMENTS

| | | | |
|---|---|---|---|
| 7,584,475 | B1 | 9/2009 | Lightstone et al. |
| 7,707,573 | B1 | 4/2010 | Marmaros et al. |
| 8,028,060 | B1 | 9/2011 | Wyld et al. |
| 9,749,209 | B2 | 8/2017 | Cimino et al. |
| 10,374,927 | B2 | 8/2019 | Cimino et al. |
| 11,057,286 | B2 | 7/2021 | Cimino et al. |
| 2004/0003042 | A1 | 1/2004 | Horvitz et al. |
| 2005/0049973 | A1 | 3/2005 | Read et al. |
| 2009/0193112 | A1 | 7/2009 | Sengupta et al. |
| 2011/0191609 | A1 | 8/2011 | Van Bokhoven et al. |
| 2011/0231680 | A1 | 9/2011 | Padmanabhan et al. |
| 2012/0102504 | A1 | 4/2012 | Iyer et al. |
| 2012/0221955 | A1 | 8/2012 | Raleigh et al. |
| 2013/0031599 | A1 | 1/2013 | Luna et al. |
| 2013/0031601 | A1 | 1/2013 | Bott |
| 2013/0097605 | A1 | 4/2013 | Martinka et al. |
| 2013/0173756 | A1* | 7/2013 | Luna ................... H04L 67/5651 709/224 |
| 2013/0267209 | A1 | 10/2013 | Bott |
| 2014/0120961 | A1 | 5/2014 | Buck |
| 2014/0140213 | A1 | 5/2014 | Raleigh et al. |
| 2014/0157026 | A1 | 6/2014 | So et al. |
| 2014/0173111 | A1 | 6/2014 | Varner |
| 2014/0280896 | A1 | 9/2014 | Papakostas et al. |
| 2015/0127819 | A1 | 5/2015 | Cimino et al. |
| 2016/0344604 | A1* | 11/2016 | Raleigh ............... H04L 41/0893 |
| 2017/0346713 | A1 | 11/2017 | Cimino et al. |
| 2020/0221338 | A1* | 7/2020 | Luna ................. H04W 52/0258 |

OTHER PUBLICATIONS

United States Patent and Trademark Office, "Non-Final Office Action," mailed in connection with U.S. Appl. No. 14/503,017, dated Jun. 6, 2016, 8 pages.

United States Patent and Trademark Office, "Final Office Action," mailed in connection with U.S. Appl. No. 14/503,017, dated Dec. 21, 2016, 10 pages.

United States Patent and Trademark Office, "Advisory Action," mailed in connection with U.S. Appl. No. 14/503,017, dated Feb. 23, 2017, 2 pages.

United States Patent and Trademark Office, "Notice of Allowance," mailed in connection with U.S. Appl. No. 15/676,191, dated Mar. 21, 2019, 7 pages.

United States Patent and Trademark Office, "Final Office Action," mailed in connection with U.S. Appl. No. 15/676,191, dated Oct. 30, 2018, 11 pages.

United States Patent and Trademark Office, "Non-final Office Action," mailed in connection with U.S. Appl. No. 15/676,191, dated Apr. 11, 2018, 10 pages.

United States Patent and Trademark Office, "Advisory Action," mailed in connection with U.S. Appl. No. 15/676,191, dated Jan. 15, 2019, 3 pages.

United States Patent and Trademark Office, "Notice of Allowance and Fee(s) Due," mailed in connection with U.S. Appl. No. 16/532,108, dated Mar. 3, 2021, 8 pages.

United States Patent and Trademark Office, "Non-Final Office Action," mailed in connection with U.S. Appl. No. 16/532,108, dated Oct. 15, 2020, 5 pages.

\* cited by examiner

METHODS AND APPARATUS TO CREDIT BACKGROUND APPLICATIONS

RELATED APPLICATION

This patent arises from a continuation of U.S. patent application Ser. No. 16/532,108, filed on Aug. 5, 2019, now U.S. Pat. No. 11/057,286, which is a continuation of U.S. patent application Ser. No. 15/676,191, filed Aug. 14, 2017, now U.S. Pat. No. 10,374,927, which is a continuation of U.S. patent application Ser. No. 14/503,017, filed on Sep. 30, 2014, now U.S. Pat. No. 9,749,209, which claims the benefit of and priority to U.S. Provisional Application No. 61/889,007, which was filed on Nov. 1, 2013. U.S. patent application Ser. No. 16/532,108, U.S. patent application Ser. No. 15/676,191, U.S. patent application Ser. No. 14/503,017, and U.S. Provisional Application Ser. No. 61/899,007 are hereby incorporated herein by reference in their respective entireties.

FIELD OF THE DISCLOSURE

This disclosure relates generally to audience measurement, and, more particularly, to methods and apparatus to credit applications.

BACKGROUND

In recent years, methods of accessing media have evolved. For example, methods of media access may now involve streaming media over a network to a consumer device. Such consumer devices often allow users to run multiple applications simultaneously. In some instances, one or more applications run in a foreground of the operating system of the consumer device while one or more applications simultaneously execute in the background context of the operating system (e.g., using parallel processing and/or simulated parallel processing).

DETAILED DESCRIPTION

Figure 1:
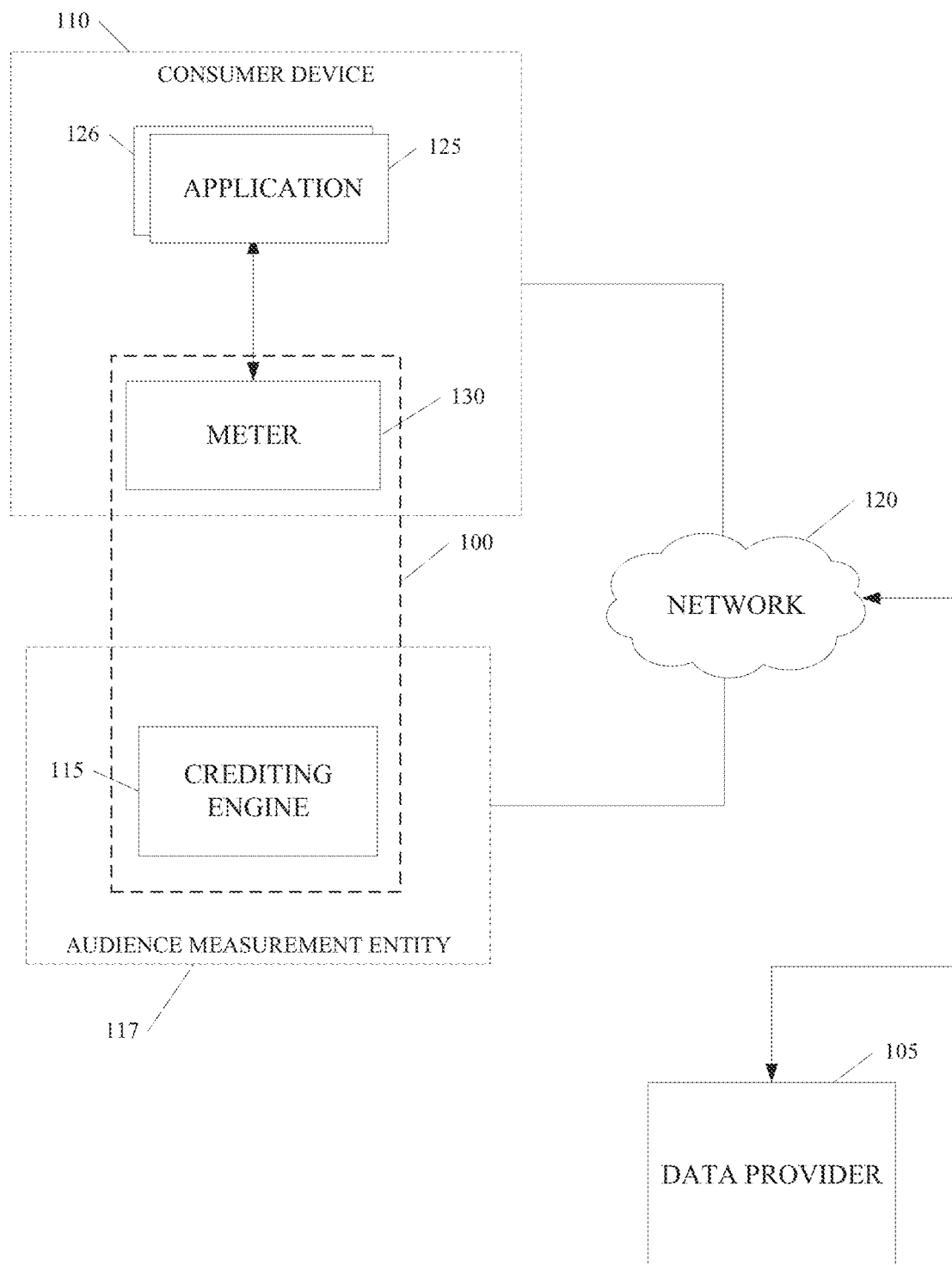
FIG. 1 is a block diagram of an example system constructed in accordance with the teachings of this disclosure to credit background applications on a consumer device and shown in an example environment of use.

As used herein, the foreground context of an application is defined as a state of visibility of the application in which the application is rendering and/or presenting output on the screen of the consumer device such that the output is visible to a user of a device. The parameters of what applications are executing in a foreground context depend on the operating system, consumer device and/or system implementations. For example a foreground application may be rendering and/or presenting output on the entirety of the screen of the consumer device, may be rendering and/or presenting output in a window that is in focus on the consumer device, may be rendering and/or presenting visible output, etc. As used herein, the background context of an application is defined as a state of visibility of an application in which the application is not rendering output to the screen of the consumer device. Like the foreground context, the parameters of what applications are executing in the background context may depend on the operating system, consumer device, and/or system.

Monitoring companies desire knowledge on media exposure and/or how users interact with media devices such as smartphones, tablets, personal computers, laptops, smart televisions, etc. In particular, media monitoring companies want to monitor media presentations made at media devices to, among other things, monitor exposure to advertisements, determine advertisement effectiveness, determine user behavior, identify purchasing behavior associated with various demographics, determine audience composition, identify usage patterns on devices, etc.

In addition to the common practice of monitoring applications running in the foreground context (e.g., foreground applications, applications in the foreground, etc.), example methods, apparatus, and articles of manufacture disclosed herein credit applications (e.g., iHeart Radio™, TuneIn Radio™, Pandora™, Slacker Radio™, Radio.com™, Spotify™, Grooveshark™, ESPN Radio™, ABC Radio™, iTunes Radio™, etc.) running (e.g., executing) in the background context (e.g., background applications, applications in the background, etc.) of a consumer device of, for example, a panelist (e.g., a smartphone, a tablet computer, etc.). For example, background applications may receive data from a server over a network and continue operation while running in the background (e.g., radio applications, music applications, video applications, navigation applications, etc.).

In some examples, multiple applications may be open on the screen of a consumer device. Then, as used herein, the primary foreground application is defined to be the application presenting and/or rendering output to a larger portion of the screen of the consumer device. Thus, as used herein, all other applications that are not the primary foreground applications and are presenting and/or rendering output on the screen are defined as visible background applications.

As used herein, the term "activity" refers to the state of an application (e.g., active or inactive). An active application may be active in the foreground or active in the background. An active applications is an application using more than a threshold amount of processor resources performing a task providing an output (e.g., an audio output), consuming more than a threshold amount of network bandwidth, and/or an combination. For example a threshold amount of network usage (e.g., bandwidth usage) used by an application for that application to be considered active is 10%. Example output produced by applications include rendering a graphical user interface (GUI) and/or notifications on a screen of a consumer device, playing music or other audio via a speaker of the consumer device, etc. Thus, output may include audio and/or tactile feedback (e.g., music may be produced by a background application that is not presenting to a display). A foreground application is considered active (e.g., has foreground activity) in some examples disclosed herein because it renders (e.g., produces) GUI output to the screen. Alternatively, a foreground application may be considered active in some examples unless the device is locked, idle, or otherwise not in active use by the user. The temporal lengths of the sessions where a foreground context application is identified as active are referred to herein as "foreground activity durations." A background application may have active sessions (e.g., background activity) because the application continues to consume more than a threshold amount of processor resources, produces output (e.g., audio), etc. while executing in the background. The temporal lengths of the sessions where a background application is determined to be active are referred to herein as "background activity durations."

In examples disclosed herein, application crediting may identify which panelist employed which application, at what time the application usage occurred, and a duration of usage for the application. As used herein, a credit is a recognition of active application usage (e.g., application usage by a panelist or other user). Both foreground and background applications can be credited with usage. In some disclosed examples, application crediting identifies application usage sessions, their durations, and/or the context of usage (e.g., foreground and/or background). In some examples disclosed herein, a crediting engine processes a log file to discern durations of application usage and/or other activities based on event records (e.g., rows in a log file containing data and/or metadata relating to the application and/or activity associated with the application). In some such examples, the crediting engine credits the application(s) with duration(s) of usage. In some such examples, applications are credited with background activity duration (e.g., the amount of time the application was active while in a background context). In some such examples, applications are credited with foreground activity duration (e.g., the amount of time the application was running while in a foreground context).

On some example consumer devices, simultaneous application execution is possible due to characteristics of the operating systems. For example, a first application executes in the foreground context while other applications (e.g., streaming media applications playing audio, navigation applications producing audible directions, etc.) execute in the background context. In some such examples, a panelist (or user) associated with a consumer device may be interacting with a foreground application while a background application performs one or more tasks (e.g., playing audio, producing audible directions, downloading media (or data and/or metadata), etc.). In these examples, the background application may not be displayed on the screen of the consumer device, but continues to consume processor resources, access data, and/or produce output. Example measurement systems disclosed herein, credits multiple example applications, executing simultaneously (e.g., applications running in both of the foreground and background contexts), with usage.

Prior metering methods are not able to determine the activity state of background applications because, for example, they have not been able to access or detect application status while the applications are executing in the background of, for example, consumer devices (e.g., due to restrictions imposed by the applications and/or operating system of a mobile device). Thus, background applications have been assumed to be inactive in prior metering systems. Examples disclosed herein overcome this problem. In particular, examples disclosed herein proceed from the recognition that the execution of an application in the background context of a consumer device (e.g., a mobile device) produces certain characteristics (e.g., a bandwidth usage pattern) that may be detected by the disclosed methods, apparatus and articles of manufacture, and leveraged to credit applications for background activity.

Figure 3A:
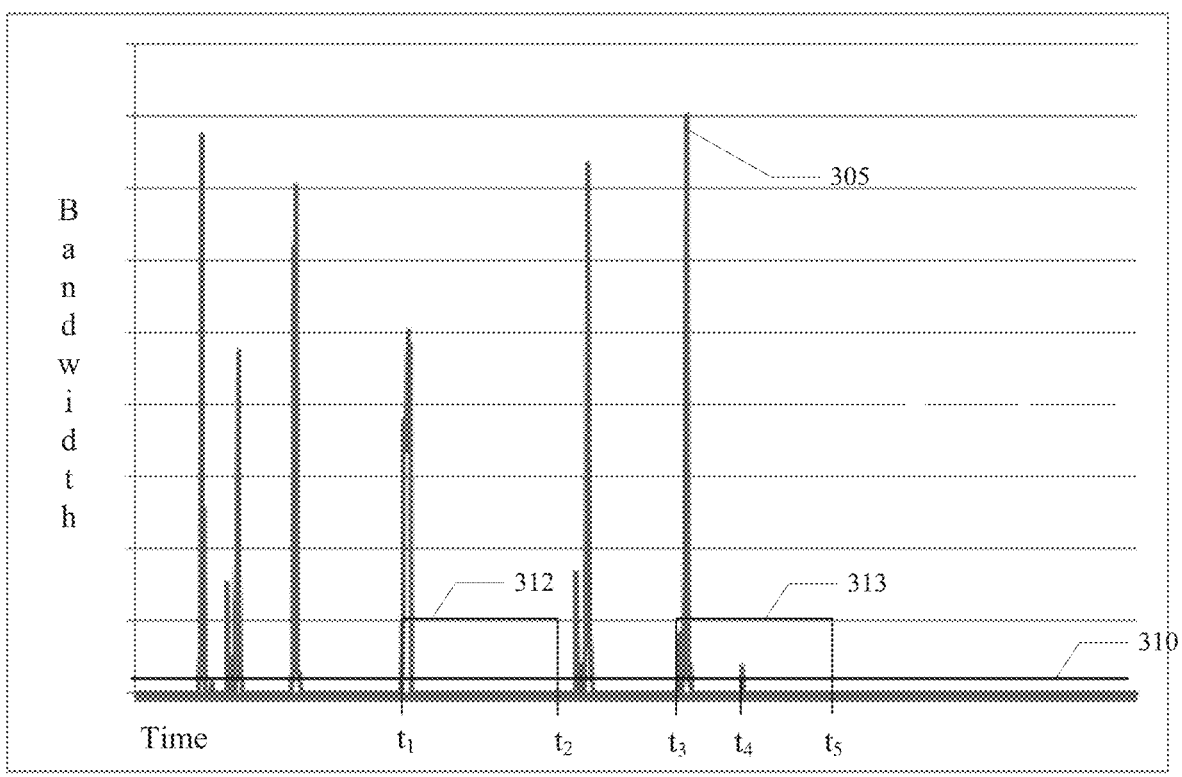
FIGS. 3A and 3B illustrate example bandwidth usage patterns of applications observed by the example meter of FIG. 1.

Example methods, apparatus, and systems disclosed herein detect distinct bandwidth usage patterns of executing applications. Some example applications, like Pandora™ music service, generate a spiked or discretely peaked bandwidth usage pattern (e.g., as shown in FIG. 3A). Other applications, such as streaming live broadcasts, generate a continuous, or plateaued, bandwidth usage pattern (e.g., FIG. 3B).

A spiked or discretely peaked bandwidth usage pattern may be produced when data (or metadata) processed by the first or second application is downloaded in increments (e.g., periods of active downloading followed by periods of inactivity during presentation) for future presentation. For example, the Pandora™ service selects the next song to present to a user. Pandora™ automatically downloads the next song to be presented while the current song is playing. Typically, downloading a song takes less time than playing the song. As a result, while actively playing a song, the Pandora™ application may not cause network activity for a time immediately after a song is downloaded until a next song is selected and downloaded. As a result, the bandwidth usage of Pandora™ is spiked (i.e., discretely peaked)

A continuous or plateaued bandwidth usage pattern is produced when data is continuously or almost continuously downloaded while the application is presenting to the user. For example, some applications present a live broadcast (e.g., live radio). Thus, downloading future data in increments (e.g., like Pandora™) is not conducive to the circumstances. In these instances, data is continuously (or substantially continuously) downloaded (e.g., there are few, if any, periods of inactivity during presentation). In some examples, a buffer is used on the user device to ensure continuous presentation despite data-delaying issues such as network traffic delays. Data delaying issues may cause the bandwidth usage pattern to have short periods of inactivity, however, such periods are infrequent. Thus, continuous (i.e., plateaued) bandwidth usage may exhibit small gaps in bandwidth usage, but over time the usage appears continuous.

To identify if an application is active, examples disclosed herein track bandwidth usage of example applications. In some examples, the applications are pre-processed or certified for analysis by an audience measurement entity.

Examples disclosed herein use observed bandwidth usage patterns to determine when an example application begins background activity, ends background activity, enters the background, exits the background (e.g., changes to foreground) begins foreground activity, ends foreground activity, enters the foreground, exits the foreground, and/or ceases execution. In some examples, a duration calculation measures usage time (e.g., activity duration) for foreground and/or a background execution on a consumer device.

In some examples, an example meter (e.g., an Electronic Mobile Measurement meter executing on a metered device), tracks an application for activity status (e.g., active or inactive) and/or context change (e.g., foreground and/or background). The meter of some such examples, generates a log file comprising event records (e.g., log entries) for context and/or activity status changes. These events are used by the crediting engine to credit duration for a particular application. Such event records contain information about the application executing on a consumer device gathered at periodic intervals. In other examples, the events may be gathered when an event is detected instead of on a periodic basis.

Example applications (e.g., a streaming media application, a navigation application, etc.) may execute tasks (e.g., downloading data, producing audio, etc.) when running in the background. In some examples, a user may be engaging a foreground application while a background application plays audio (e.g. via speakers of the device). Examples disclosed herein, credit activity durations for the activity of both the foreground application and the background application.

FIG. 1 is a block diagram of an example measurement system 100. The example measurement system 100 meters applications running in the foreground and/or background of the example computing devices (e.g., consumer device 110) via an example meter 130 and credits the foreground and/or background applications via an example crediting engine 115. The example environment of use depicted in FIG. 1 includes an example data provider 105, an example consumer device 110, and an example network 120. The example measurement system 100 includes the example meter 130 and the example crediting engine 115 of the example audience measurement entity 117. The example consumer device 110 of this example executes an example first application 125, an example second application 126, and the example meter 130. The example audience measurement entity 117 further comprises the example crediting engine 115. Additionally, while only one consumer device is depicted in the example of FIG. 1, multiple consumer devices are monitored simultaneously (e.g., mobile devices, stationary devices, etc.).

In the illustrated example, the first application 125 executes in the foreground of the example consumer device 110 and the second example application 126 executes in the background of the example consumer device 110. Both of the first and second applications 125, 126 of this example obtain data via the example network 120 from the example data provider 105. While executing on the example consumer device 110, the first and second applications 125 and 126 are monitored by the example meter 130. For example, the example meter 130 of FIG. 1 periodically records the status (and/or other information) of each of the first and second applications as event records in a log file. Such status may indicate, for example, the identity of the application corresponding to the event record, the context of that application, the activity state of that application, current media accessed by that application, the current bandwidth usage of that same application, etc. Periodically and/or aperiodically, the example meter 130 transmits the log file to the example audience measurement entity 117. In the illustrated example, the log file is sent to the example crediting engine 115 of the example audience measurement entity 117. The example crediting engine 115 of the illustrated example processes the log file and assigns durations of usage to the example application(s) (125,126) identified in the log file (e.g., the first and/or the second application).

The consumer device 110 of the illustrated example FIG. 1 is a consumer device operating a consumer operating system (e.g. iOS™ RIM™, Windows Mobile™, Android™, or Ubuntu Mobile™). The mobile operating system is specifically designed to run on mobile devices such as mobile phones, smartphones, tablets, smartwatches, wearable devices, or other handheld devices (e.g. iPhone™, iPad™, Google Nexus™, Samsung Galaxy Gear™, or Google Glass™). The operating system of the consumer device 110 facilitates the execution of the example first and second applications 125, 126. The first and second applications 125, 126 may be, for example, media presenting applications such as Pandora™, iTunes Radio™, Spotify™, iHeartRadio™, or ESPN Radio™. Alternatively, the consumer device 110 may be any type of computing device such as, for example, a laptop computer, a tablet computer, a desktop computer, etc.

In the example of FIG. 1, the consumer device 110 executes the example first application 125 in the foreground and executes the example second application 126 in the background. However, both of the first and second applications are capable of obtaining data from the example data provider 105. The example consumer device 110 of FIG. 1 is capable of retrieving (e.g., streaming and/or downloading) any suitable type of data (e.g., streaming media, navigation data, text to speech requests, voice-recognition data, etc.). In the illustrated example of FIG. 1, the consumer device 110 of FIG. 1 communicates with the example data provider 105 via the example network 120 to obtain data to present via the first and/or second applications 125,126. The example network 120 of the illustrated example FIG. 1 is a wide area network (WAN) such as the Internet. In other examples, other types of networks and/or multiple networks (e.g. a cellular network, an Ethernet network, etc.) may be utilized to implement the example network 120 of FIG. 1.

The example data provider 105 of FIG. 1 provides data (e.g., media) to be presented in the example first application 125 and/or the second application 126. The example data provider 105 may be, for example, a media streaming service and associated server(s), such as, for example, Pandora™, Spotify™, iHeartRadio™, Hulu™, HBO Go™, ESPN Radio™, iTunes Radio™, etc.

In the example system 100 of FIG. 1, data (e.g., streaming media) flows from a data provider 105 to the example first and/or second application 125, 126 running on the consumer device 110. Additionally, the example consumer device 110 is provided with the meter 130 to observe the first and/or second applications 125, 126 and their associated bandwidth usages.

The meter 130 of the illustrated example FIG. 1 records bandwidth usage and special events. Special events, as used herein, include an application (e.g., the example first and/or second applications 125, 126) changing context (e.g., changing from the foreground to the background or vice versa), an application opening or starting, audio output, loss of power to the consumer device, shut-down commands, etc. In some examples, special events designate activity status of corresponding applications. For example, a power off special event designates that the application has become inactive. In the example FIG. 1, the bandwidth usage and special events are collected using an application programming interface (API) of the operating system. However, any other method suitable for detecting such bandwidth usage and/or special events from the applications and/or consumer device may be used. For example, the control panel of a Windows™ operating system may be accessed. Data reflective of the bandwidth usage and/or special events are stored in the log file as occurring during the monitoring of the corresponding application (e.g., example application 125 and/or 126). The log file may be in any desired type such as, for example, an extensible markup language (XML) file, a comma separated values (CSV) file, a common (or extended) log format (CLF/ELF) file, a text file, and/or any other file having any other type of file format capable of storing logged information.

As explained above, the example meter 130 periodically and/or aperiodically transmits the log file to the example crediting engine 115 of the example audience measurement entity 117. The example audience measurement entity 117 of the illustrated example is an entity gathering usage and/or audience measurement statistics such as, for example, The Nielsen Company (US), LLC. Based on the event records in the log file, the example crediting engine 115 credits activity to the corresponding application(s) (e.g., the first and/or second applications 125, 126). The crediting of activity to applications also credits the activity to the associated data provider (e.g., data provider 105) and/or the associated media.

The example crediting engine 115 of the illustrated example processes the log file received from the example meter 130. From the log file, the example crediting engine 115 generates durations for activity. The durations of activity represent how long the corresponding applications (e.g., the first and/or second applications 125, 126) were active and the context (e.g., foreground or background) of the corresponding application(s). As discussed in further detail below, the crediting engine 115 credits the application(s) with durations of activity based on the event records in the log file, the bandwidth usage of the application(s), the bandwidth patterns of the application(s), and/or special events associated with the execution of the application(s).

Figure 2:
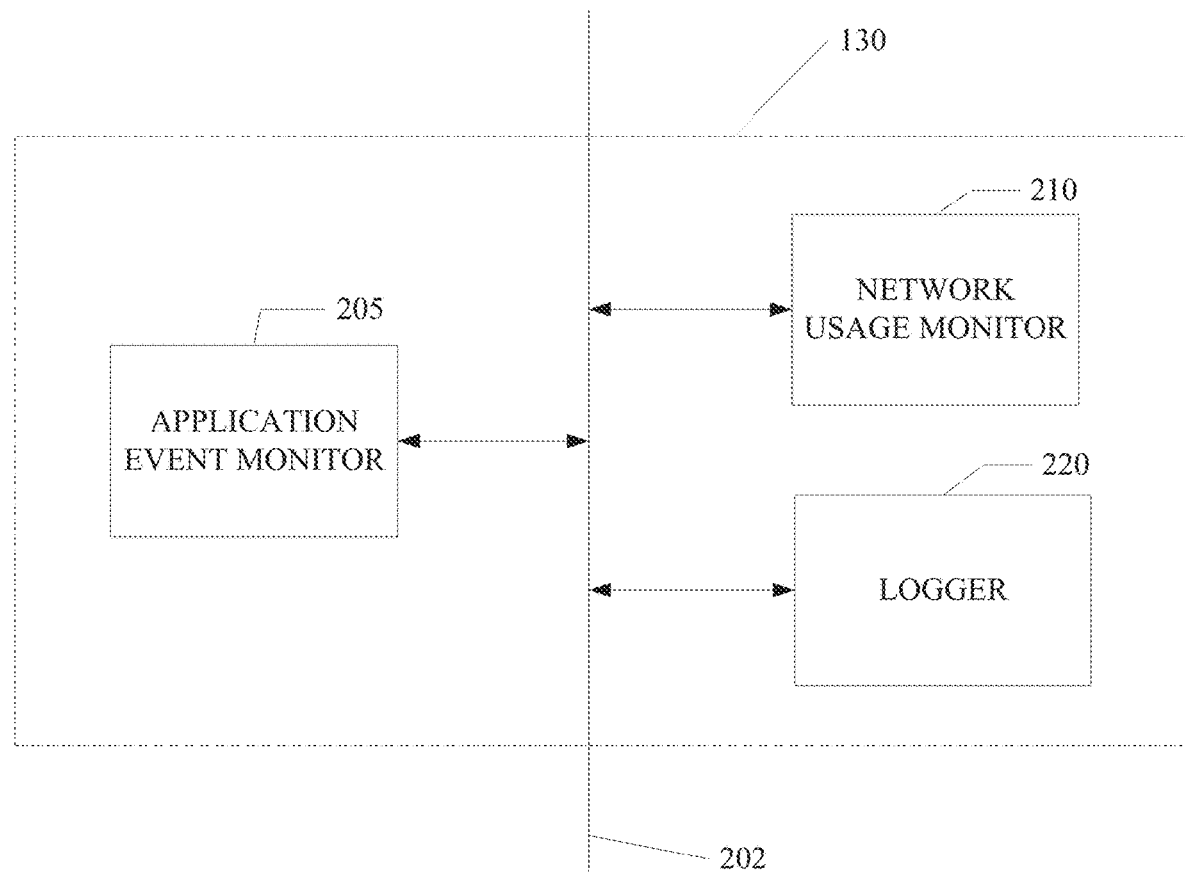
FIG. 2 is a block diagram of an example implementation of the meter of FIG. 1 for metering applications running in the foreground and background of the consumer device of FIG. 1.

FIG. 2 is a block diagram of an example implementation of the meter 130 of FIG. 1. The example meter 130 of FIG. 2 includes a data bus 202 facilitating communication between an example application event monitor 205, an example network usage monitor 210, and an example logger 220. In some examples the data bus is not used and/or is provided by the consumer device 110.

The example application event monitor 205 of example FIG. 2 detects special events associated with one or more application(s) executing on the consumer device 110. Examples of special events that are detectable by the example application event monitor 205 include an application (e.g., either or both of the example first and second applications 125, 126) changing context (e.g., changing from the foreground to the background or vice versa), an application opening or starting, an application outputting audio, etc. In some examples, power-related special events associated with the example consumer device 110 (e.g., loss of power, shut-downs, emergency shut-downs, etc.) are detected for logging by the example application event monitor 205. The example application event monitor 205 detects these special events by, for example, communicating with the operating system (e.g., using an API of the operating system) of the example consumer device 110.

In some examples, applications to be monitored on the consumer device 110 are identified to the example application event monitor 205 by the example audience measurement entity 117 via the example network 120 of FIG. 1. In the illustrated example of FIG. 2, a list of applications for monitoring is transmitted to the example application event monitor 205 by the example audience measurement entity 117. In other examples, the application event monitor 205 monitors all applications running on the example consumer device 110. Additionally or alternatively, the example application event monitor 205 may limit its monitoring to applications of a particular type (e.g., media presentation applications). In some other examples, the example application event monitor 205 limits its monitoring to applications having particular characteristics such as access to the Internet.

In some examples, audio output is detected by the application event monitor 205 to provide an indication of whether or not an application is active (e.g., an application producing audio may be considered active even though it is executing in the background). To this end, the application event monitor 205 of the illustrated example queries the operating system of the consumer device 110 through API functions, to determine the presence of audio output associated with the metered application. However, in other examples, audio may not be accessible and/or audio detection may not be reliable for use in determining activity. For example, the audio may be muted, undetectable, encrypted, and/or protected from access, any of which may impede (e.g., prevent) detection of audio by the application event monitor 205. Thus, in some instances, it may not be advantageous to rely upon audio detection to determine application activity.

In the illustrated example of FIG. 2, the example application event monitor 205 monitors the operating system of the consumer device 110 to detect special events. In other examples, the example application event monitor 205 directly monitors metered application(s). For example, an API function associated with a metered application (e.g., the example first and/or second application 125, 126) may contain privately broadcast functions which are detectable by example application(s) event monitor 205 when the application changes context. In other examples, the example application event monitor 205 observes process threads of the application being metered (e.g., the example first and/or second application 125, 126) to detect special events.

The example network usage monitor 210 of the example of FIG. 2 monitors the bandwidth usage of the example applications running on the example consumer device 110. The bandwidth usage and the bandwidth pattern are used, as explained in further detail below, by the example network usage monitor 210 to determine if an application running in the background is active.

The example network usage monitor 210 of the illustrated example communicates with a network interface of the example consumer device 110 to monitor the amount of bandwidth consumed by each executing application. The bandwidth usage is observed by sampling the data consumption rate during a monitoring period. In the example network usage monitor 210 of FIG. 2, the network usage monitor 210 averages the data consumption rate over a sampling period (e.g., three seconds) that is shorter than the monitoring period (e.g., 10 seconds). The averaged data consumption rate is defined herein to be the bandwidth usage. In some examples, the bandwidth usage for the consumer device 110 may be obtained by the network usage monitor 210 by monitoring a system thread of the consumer device 110 and/or querying a network interface of the consumer device 110. In other examples, the bandwidth usage may be obtained by the network usage monitor 210 via a query of the operating system task manager. In some other examples, the bandwidth usage may be obtained by monitoring application specific network ports on the consumer device 110. In yet other examples, the bandwidth usage may be recorded and stored in a system file by the operating system of the example consumer device 110 and the example network usage monitor 210 may then obtain the bandwidth usage by reading the system file.

The example network usage monitor 210 also determines corresponding bandwidth usage patterns of the application(s) (e.g., the first and second applications 125, 126). For example, the determined bandwidth usage pattern for a given application may comprise spikes or discrete peaks and valleys (e.g., as seen in connection with downloading type streaming media like Pandora™) or plateau(s) (e.g., as seen in connection with continuous streaming media like ESPN Radio™, iTunes Radio™, etc.). In the illustrated example, the bandwidth usage pattern is provided to the example network usage monitor 210 by the example audience measurement entity 117 via the example network 120 at periodic intervals. Alternatively, the bandwidth usage pattern may be provided to the example network usage monitor 210 at aperiodic intervals. The example audience measurement entity 117 contains a database of applications (e.g., including the example first and/or second application 125, 126) and their associated bandwidth usage pattern(s). The bandwidth usage pattern of applications may be provided to the example meter 130, or more specifically, the network usage monitor 210 when the example meter 130 is notified by the example audience measurement entity 117 of applications which are to be metered. Additionally or alternatively, the example network usage monitor 210 may send back network usage data to the audience measurement entity 117 for bandwidth usage pattern determination. In other examples, the bandwidth usage pattern may be determined by the example network usage monitor 210 during a calibration period of the network usage monitor 210. By monitoring the bandwidth usage of the example consumer device 110, the bandwidth pattern may be identified through peak to valley ratioing, image recognition of charted bandwidth usage, etc. During the example calibration period, the bandwidth usage is monitored by the example network usage monitor 210 for some period before metering begins in order to obtain the bandwidth usage pattern. In other examples, the calibration period may occur concurrently with application metering.

When the example network usage monitor 210 of the illustrated example determines the bandwidth usage pattern, a bandwidth usage threshold may be set to determine if the application in the background is active. In some examples, data may be obtained by the example application (e.g., the first and/or second application 125, 126) while the application is inactive (e.g., a keep-alive signal, etc.). Thus, it is desirable to set a bandwidth usage threshold to distinguish between (1) bandwidth usage indicative of activity of the application and (2) bandwidth usage not indicative of activity of the application (e.g., an application may be considered inactive when only receiving text overlay alerts, graphical advertisement data (e.g., banner advertisements), etc.). The bandwidth usage threshold is described in more detail in association with FIG. 3.

In the illustrated example, the example network usage monitor 210 monitors the bandwidth usage associated with metered applications (e.g., the example first and/or second applications 125, 126). The example averaging of the data consumption rate results in a value that effectively disregards data consumption rate anomalies prevalent in internet protocol traffic (e.g., transient network traffic congestion). In some other examples, however, the network usage monitor 210 employs instantaneous data consumption rates as the bandwidth usage. Regardless of the sampling technique, the bandwidth usage is evaluated against the bandwidth usage threshold to identify background application activity status.

The example logger 220 of the example meter 130 of FIG. 2 generates event records in a log file for flagged application events. For example, when the example application event monitor 205 detects a special event, or when the monitoring period of the network usage monitor 210 has ended, the example logger 220 generates event records in the log file respectively corresponding to the metered application(s) executing on the consumer device 110. An entry in the log file may contain, for example, panelist identification data, an identity of the metered application, context of the application (e.g., foreground or background), data identifying activity status, a timestamp, a bandwidth usage value, a bandwidth usage pattern, and/or special event identification. In some instances, the log file is transmitted by the example logger 220 to the audience measurement entity 117 periodically. In other examples, the log file is transmitted by the example logger 220 to the audience measurement entity 117 via the example network 120 aperiodically (e.g., upon request).

While an example manner of implementing the example meter 130 of FIG. 1 is illustrated in FIG. 2, one or more of the elements, processes and/or devices illustrated in FIG. 2 may be combined, divided, re-arranged, omitted, eliminated and/or implemented in any other way. Further, the example application event monitor 205, the example network usage monitor 210, the example logger 220 and/or, more generally, the example meter 130 of FIG. 2 may be implemented by hardware, software, firmware and/or any combination of hardware, software and/or firmware. Thus, for example, any of the example application event monitor 205, the example network usage monitor 210, the example logger 220 and/or, more generally, the example meter 130 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example, the example application event monitor 205, the example network usage monitor 210, the example logger 220 are hereby expressly defined to include a tangible computer readable storage device or storage disc such as a memory, DVD, CD, Blu-ray, etc. storing the software and/or firmware. Further still, the example meter 130 of FIG. 3 may include one or more elements, processes and/or devices in addition to, or instead of, those illustrated in FIG. 3, and/or may include more than one of any or all of the illustrated elements, processes and devices.

Figure 3B:
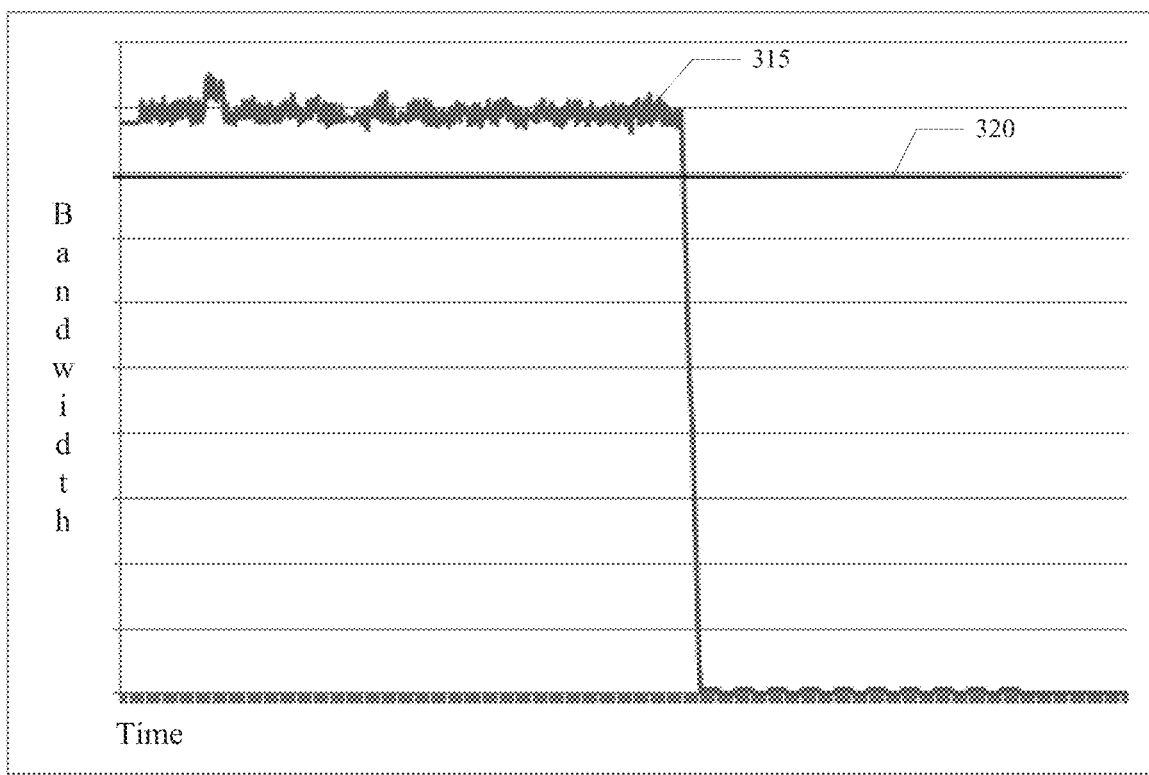

FIGS. 3A and 3B are example graphical depictions of bandwidth usage patterns of background applications observed by the example network usage monitor 210 and example bandwidth usage thresholds 310, 320 associated with each pattern (e.g., spiked bandwidth usage threshold 310 and continuous bandwidth usage threshold 320).

FIG. 3A is an example of a bandwidth usage pattern of an application such as the Pandora™ application executing in the background. The peaks, such as an example peak 305, represent downloads of data to be presented via the application. In this example, when the downloaded data is presented via the application, a period of inactivity follows.

Sometime later, the application begins another download for subsequent data to be presented. This activity results in a pattern of spikes of high bandwidth usage separated by periods of low bandwidth usage. In order to identify the occurrences of this pattern, and, thus, determine when a background application is active, a spiked bandwidth usage threshold 310 is implemented. For example, an application in the background is considered active when the bandwidth usage is above the spiked bandwidth usage threshold 310. However, as could be inferred from the FIG. 3A, because of the burstiness of the bandwidth usage activity, there may be many periodic observations below the bandwidth usage threshold 310. Thus, in order to determine if a pattern similar to the pattern of FIG. 3A is present, temporal activity windows are instituted at the example crediting engine 115 while processing a log file to further assist in determining if the background application is active.

Converse to continuous streaming where an absence of bandwidth generally indicates a lack of activity, the peaks of the bandwidth pattern of FIG. 3A represent the download of an entire media file to be presented a short while later. In some instances, there may exist periods of little to no bandwidth usage between and the download peaks. For example, a user of the consumer device 110 may wait some period of time after the conclusion of a song before selecting a next song, the application being metered may halt presentation of audio to present a prompt querying a user's engagement with the application and/or the background application may periodically download a next song while a current song is playing per the Pandora™ example above.

Due to the circumstances such as those described above, the example crediting engine 115 of FIG. 1 defines temporal activity windows 312, 313 when a background start flag is created (e.g., at $t_1$ and $t_3$). The temporal activity windows represent a prediction that, for a period of time (e.g., t1 to t2 which may, for example, correspond to the average length of a song (e.g., three minutes and thirty seconds)) an application will remain active to present the media that was downloaded at a time corresponding to the most recent peak in bandwidth usage. If the example crediting engine 115 does not detect an active application within the temporal activity window, then the media associated with the peak has been presented because no further activity is occurring.

It is noted that temporal activity windows 312, 313 are applied to all peaks in the example FIG. 3A but for clarity are only drawn on the fourth and sixth peaks of the illustrated example. The temporal activity windows 312, 313 in the illustrated example FIG. 3A are three minute periods, however, other time windows may be employed. The first illustrated temporal activity window 312 is implemented by the example crediting engine 115. At time $t_2$, the example crediting engine 115 denotes that the corresponding application has gone inactive because no other activity has been detected within the first temporal activity window 312. The second example temporal activity window 313 begins at time $t_3$. In the illustrated example, the second example temporal activity window 313 is a three minute window. However, at time $t_4$, bandwidth activity above the threshold is detected during the second temporal activity window 313 indicating the corresponding application is active. Accordingly, while not illustrated, a new (e.g., three minutes) temporal activity window is implemented at time $t_4$ to start a new 3 minute temporal activity window.

FIG. 3B is an example graphical representation of bandwidth usage of an application such as ESPN Radio™ or iTunes Radio™. Generally, radio media that is broadcast via the internet is broadcast live or sufficiently close to live (e.g., with a seven second delay). Due to the nature of live broadcasts, media is downloaded near the time that it is presented. Thus, the bandwidth usage is near constant as depicted in the example pattern 315 of FIG. 3B. The pattern of FIG. 3A is more frequently around zero whereas the pattern of FIG. 3B is more frequently at a non-zero value during activity. Because of this characteristic, the continuous bandwidth usage threshold 320 is set higher than the spiked bandwidth usage threshold 310 of FIG. 3A. The continuous bandwidth usage threshold 320 enables differentiation between bandwidth usage associated with application activity and bandwidth usage not indicative of activity.

In some examples where a background application presents both streaming and downloaded media, multiple bandwidth usage thresholds may be set for the background application. For example, a background application (e.g., the first and/or second example applications 125, 126) may contain a live radio broadcast option as well as a random music option. Thus, the example network usage monitor 210 may employ multiple activity criteria (e.g., multiple bandwidth usage thresholds (e.g., the spiked bandwidth usage threshold 310 and the continuous bandwidth usage threshold) and/or multiple temporal activity windows to determine application activity). In other examples, the example network usage monitor 210 may be able to determine the data presentation type (e.g., live, pre-downloaded, etc.) and utilize the appropriate bandwidth usage threshold accordingly.

Figure 4:
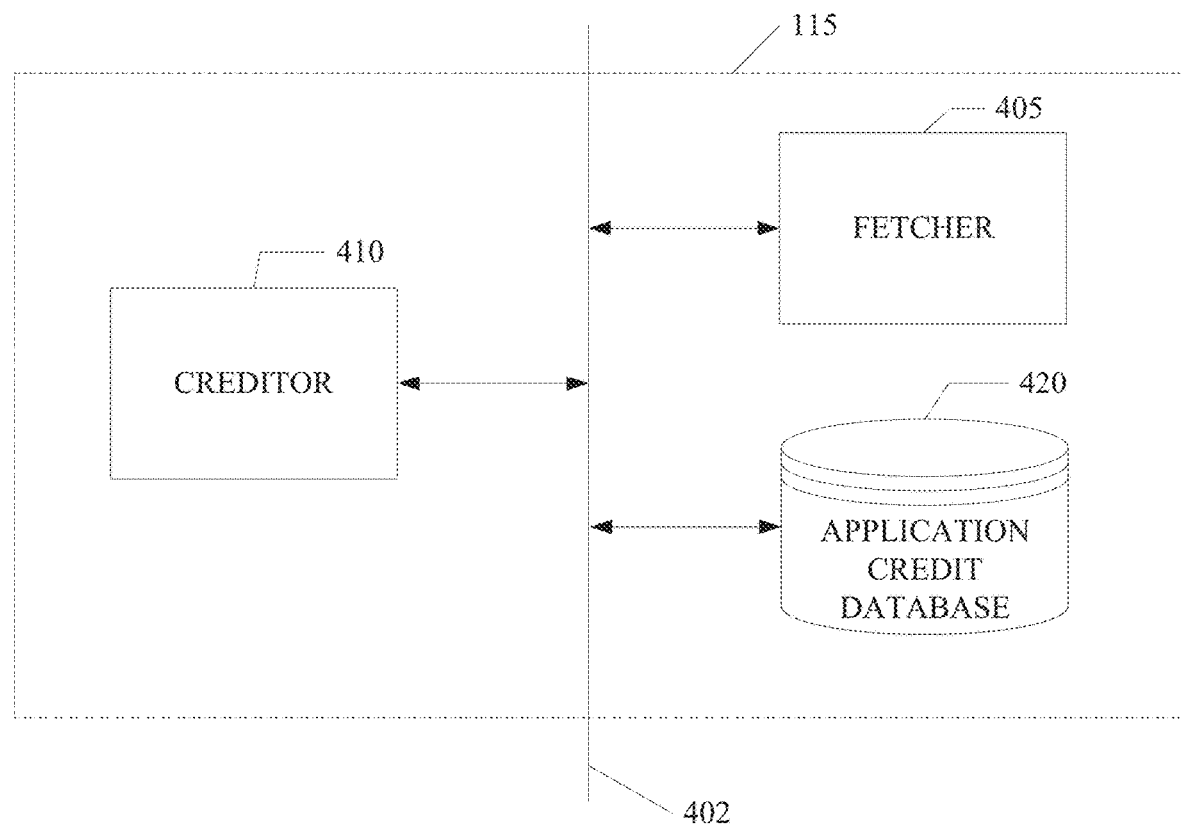
FIG. 4 is a block diagram of an example implementation of the crediting engine of FIG. 1 for crediting application usage.

FIG. 4 is a block diagram of an example implementation of the example crediting engine 115 of FIG. 1. The example crediting engine 115 of FIG. 4 includes a data bus 402 facilitating communication between an example fetcher 405, an example creditor 410, and an example application credit database 420. In some examples, the data bus is not used and/or is provided by the audience measurement entity 117.

The example fetcher 405 of FIG. 4 requests log files containing logged application events from the example consumer device 110 of FIGS. 1 and/or 2. In the illustrated example of FIG. 4, the example fetcher 405 sends a request for the log file of application events to the example consumer device 110 via the example network 120. The example fetcher 405, in some instances, may send the request and download the log file using an encrypted connection. In some examples, the example fetcher 405 may not send a request to the example consumer device 110. Rather, in such an example, the log files are pushed to the example crediting engine 115 by the various consumer devices being monitored. The example fetcher 405 only manages the receipt of the log files (e.g., log files pushed to the example fetcher 405 from one or more consumer devices). Regardless of the method of obtaining the log files, the example fetcher 405 makes the log files available for processing by the example creditor 410.

The example creditor 410 of the illustrated example credits applications with usage durations based on the event records in the log file. In the illustrated example of FIG. 4, the example creditor 410 obtains the log file from the example fetcher 405 and attributes start and stop flags to the event records in the log file. The example creditor 410 calculates durations of usage based on the times between the start and stop flags. Additionally, the example creditor 410 marks the durations of usage as one of foreground or background. In the illustrated example FIG. 4, applications are credited with either a foreground and a background duration based on the event records in the log file(s). In some examples, if the temporal activity windows (e.g., temporal threshold windows 312, 313 of FIG. 3A) were not implemented, based on the bandwidth, the background usage times for the peaked bandwidth usage pattern applications would only be recorded for the times at which the bandwidth rate is above the bandwidth usage threshold 310. Such a result would incorrectly reduce the amount of time credited to such background applications.

In some examples, the example creditor 410 may separately credit foreground and background event records. For example, the creditor 410 may initially only process events designated in the log file as associated with background applications. When all background event records have been processed by the example creditor 410, the example creditor 410 begins to process the foreground event records in the log file.

In some examples, the example creditor 410 may accumulate and credit the foreground and background durations as a total duration credit. Durations are stored in the application credit database 420.

In the illustrated example, the example creditor 410 also calculates audience size. For example, each panelist associated with log files is used to calculate a total audience size for a corresponding application.

Additionally or alternatively, the example components of the example meter 130 of FIG. 2 may be implemented in the example crediting engine 115 of FIG. 4. Thus, metering and crediting may be performed in the example crediting engine 115 of FIG. 4.

While an example manner of implementing the example crediting engine 115 of FIG. 1 is illustrated in FIG. 4, one or more of the elements, processes and/or devices illustrated in FIG. 4 may be combined, divided, re-arranged, omitted, eliminated and/or implemented in any other way. Further, the example fetcher 405, the example creditor 410, the example application credit database 420 and/or, more generally, the example crediting engine 115 of FIG. 4 may be implemented by hardware, software, firmware and/or any combination of hardware, software and/or firmware. Thus, for example, any of the example fetcher 405, the example creditor 410, the example application credit database 420 and/or, more generally, the example crediting engine 115 of FIG. 4 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example fetcher 405, the example creditor 410, and the example application credit database 420 are hereby expressly defined to include a tangible computer readable storage device or storage disc such as a memory, DVD, CD, Blu-ray, etc. storing the software and/or firmware. Further still, the example crediting engine 115 of FIG. 4 may include one or more elements, processes and/or devices in addition to, or instead of, those illustrated in FIG. 4, and/or may include more than one of any or all of the illustrated elements, processes and devices.

Figure 5:
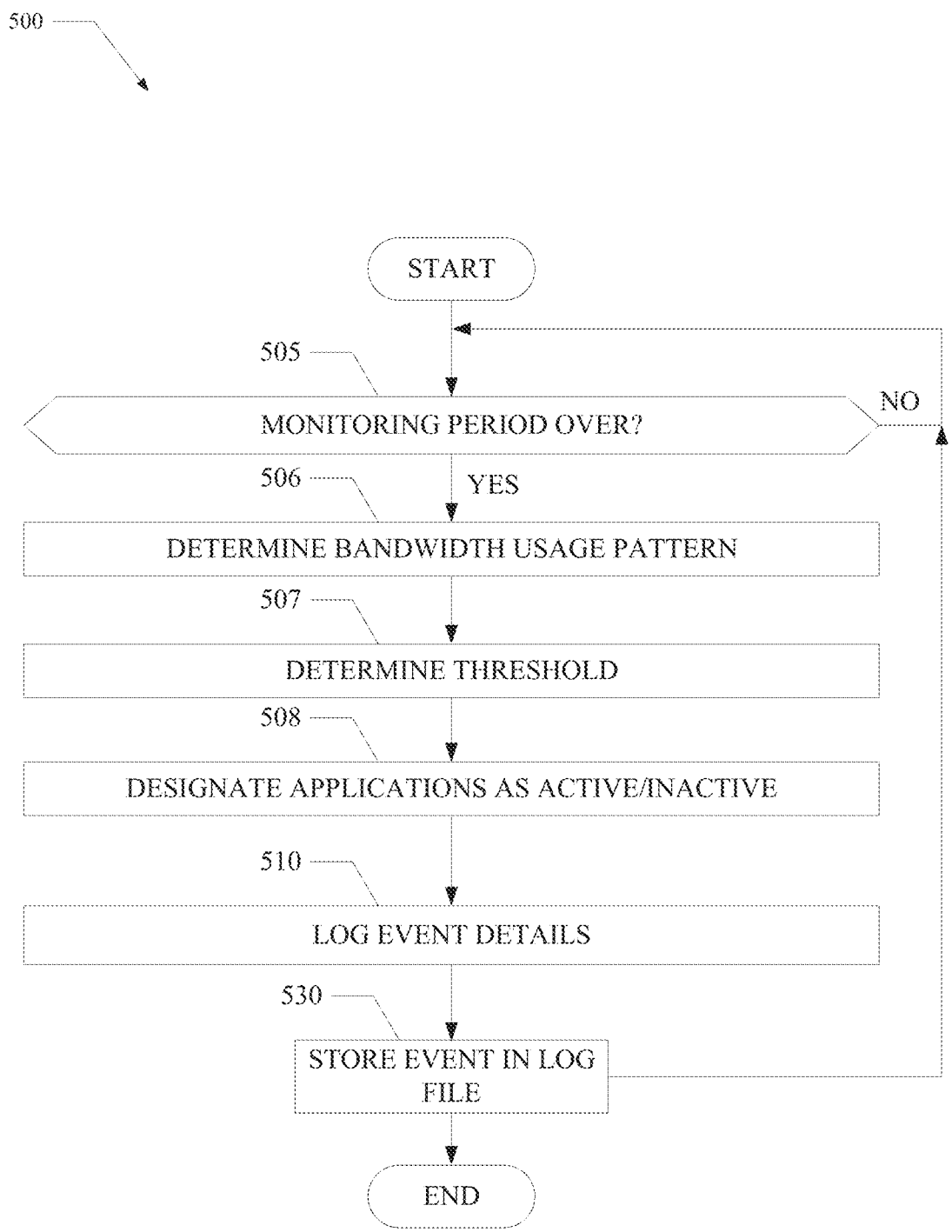
FIG. 5 is a flowchart representative of example machine-readable instructions that may be executed to implement the example meter of FIG. 1.

A flowchart representative of example machine readable instructions for implementing the example meter of FIGS. 1 and 2 is shown in FIG. 5. In this example, the machine readable instructions comprise a program for execution by a processor such as the processor 1012 shown in the example processor platform 1000 discussed below in connection with FIG. 10. The program may be embodied in software stored on a tangible computer readable storage medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 5, many other methods of implementing the example meter 130 may alternatively be used. For example, the order of execution of the blocks may be changed, and/or some of the blocks described may be changed, eliminated, or combined.

Figure 6:
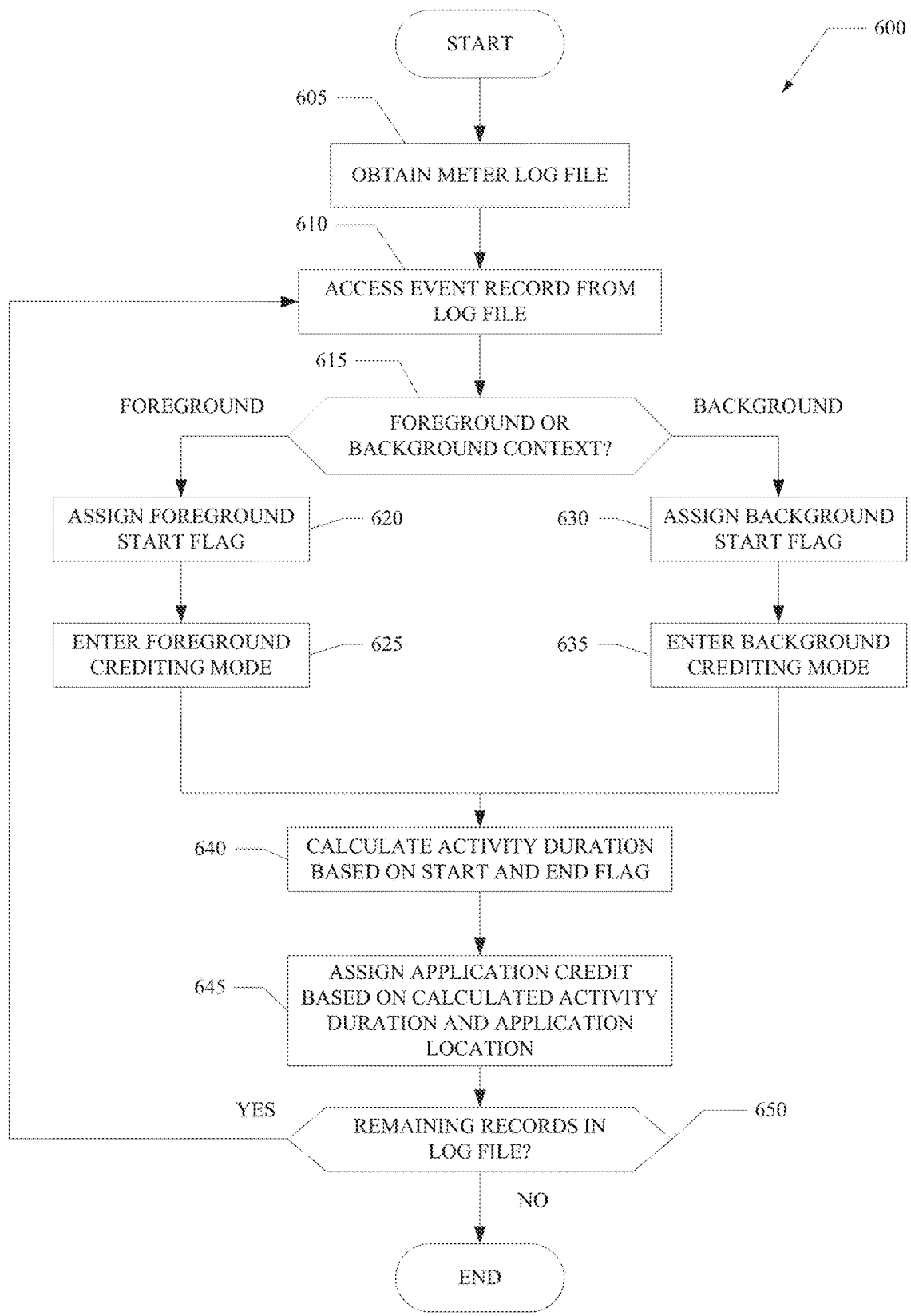
FIG. 6 is a flowchart representative of example machine-readable instructions that may be executed to implement the example crediting engine of FIG. 1.
Figure 7:
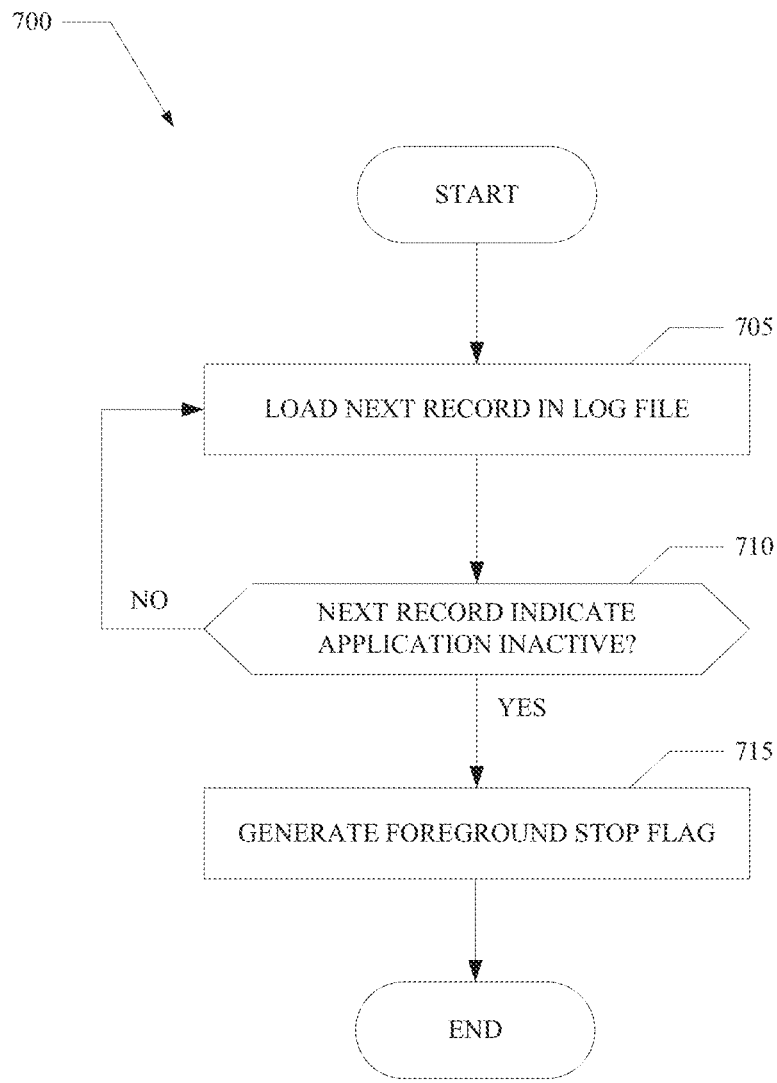
FIG. 7 is a flowchart representative of example machine readable instructions that may be executed to implement the example creditor of FIG. 4 to assign credits to foreground applications.
Figure 8:
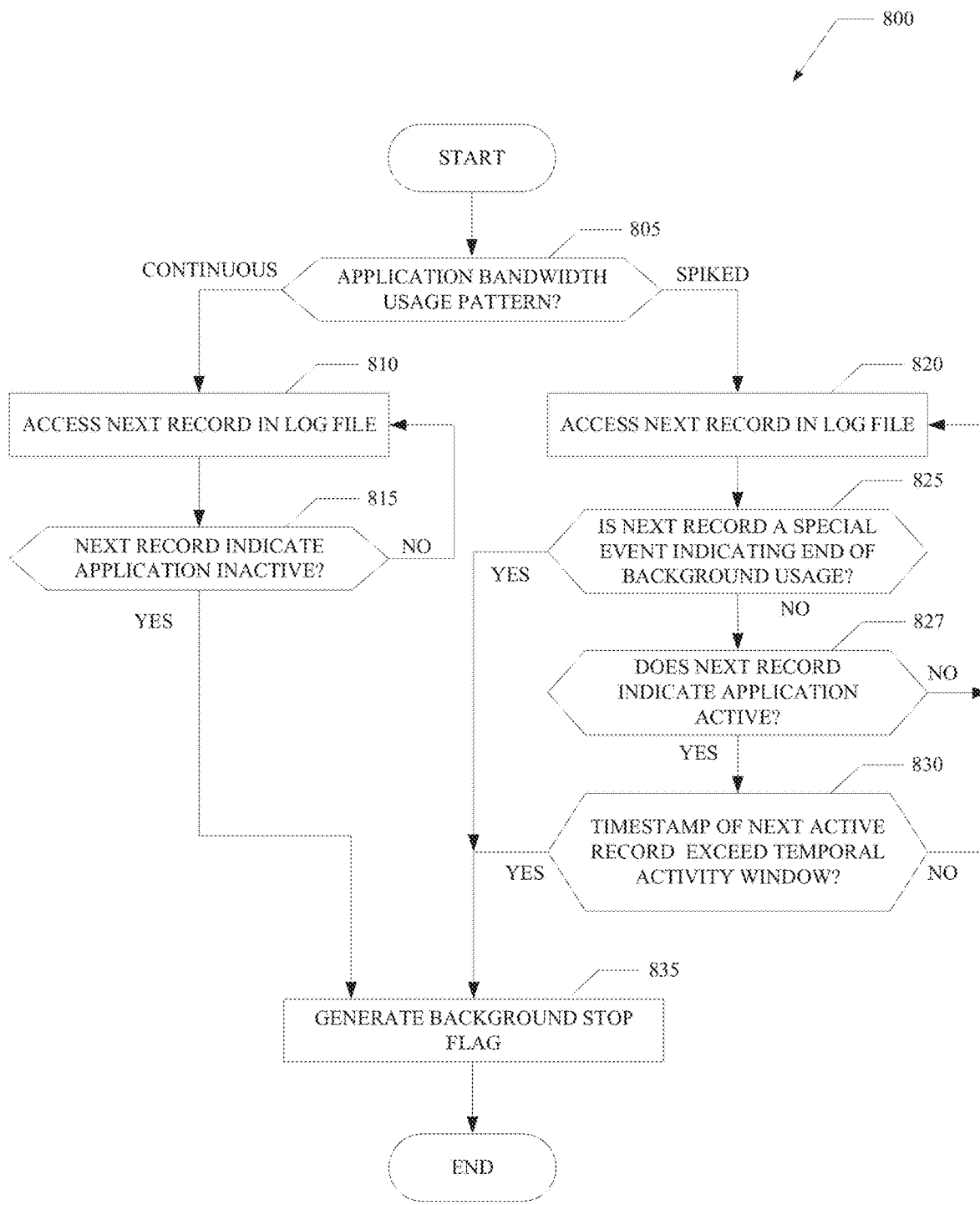
FIG. 8 is a flowchart representative of example machine readable instructions that may be executed to implement the example creditor of FIG. 4 to assign credits to background applications.

Flowcharts representative of example machine readable instructions for implementing the example crediting engine 115 of FIGS. 1 and 4 are shown in FIGS. 6, 7, and 8. In this example, the machine readable instructions comprise a program for execution by a processor such as the processor 1112 shown in the example processor platform 1100 discussed below in connection with FIG. 11. The program may be embodied in software stored on a tangible computer readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example programs are described with reference to the flowcharts illustrated in FIGS. 6, 7, and 8, many other methods of implementing the example crediting engine 115 may alternatively be used. For example, the order of execution of the blocks may be changed, and/or some of the blocks described may be changed, eliminated, or combined.

As mentioned above, the example processes of FIGS. 5, 6, 7, and 8, may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 5, 6, 7, and 8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

FIG. 5 is a flowchart representative of example machine-readable instructions 500 that may be executed to implement the example meter 130 of FIG. 3. The program 500 begins when an application designated for metering begins operation.

The example application event monitor 205 of the example meter 130 begins monitoring the metered application (e.g., the example application 125, 126) at block 505. For example, when a user opens a metered application such as Spotify™ on a consumer device (e.g., the consumer device 110), the example meter 130, or more specifically, the example application event monitor 205 monitors for special events associated with the metered application. In some examples, monitoring may halt when the application is placed in a suspended, locked, or powered down mode.

The monitoring of block 505 is performed over a monitoring period. For example, at the end of a specified period of time, (e.g., 30 seconds), the example meter 130 proceeds to log the status of every metered application on the consumer device 110.

Concurrently at block 505, the example network usage monitor 210 monitors the bandwidth usage of the metered application. In the illustrated example, the network usage monitor 210 monitors the bandwidth usage of the application via the network interface of the example consumer device 110 (e.g., interface 1020 of FIG. 10).

In some examples, the application event monitor 205 monitors for special events associated with metered applications.

At block 506, the example network usage monitor 210 identifies the bandwidth usage pattern of the metered applications. In the illustrated example, the example network usage monitor 210 references a file provided by the audience measurement entity 117 to identify the bandwidth usage patterns of the metered applications. In some examples, the network usage monitor 210 may identify the bandwidth usage pattern during a calibration period as explained above.

The example network usage monitor 210 obtains metered application specific thresholds from the example audience measurement entity 117 (e.g., bandwidth usage threshold(s) 310, 320) for determining if a background application is active (block 507).

By comparing an observed bandwidth value of the background application to the bandwidth usage threshold value, the example network usage monitor 210 makes an active/inactive designation for the background application (block 508). For example, if the example network usage monitor 210 determines that the observed bandwidth value is above the bandwidth usage threshold, the background application may be designated as active. Conversely, if the value is below the bandwidth usage threshold, the application may be designated as inactive. Additionally, at block 508, all applications executing in the foreground, receive an application active designation.

At block 510, the example logger 220 begins generating event records in a log file. The example logger 220 gathers information about the applications executing at the end of the monitoring period (block 505) and logs information associated with the metered applications. In other examples, only metered applications whose status has changed (e.g., changed from active to inactive) are be logged. For example, the example logger 220 will only log information associated with an application when it is determined that the current activity state of the application is different from the previous activity state of the application.

The example logger 220 identifies the metered applications, the timestamp, the bandwidth usage pattern for the background application, the context of the applications (e.g., foreground or background), the activity state of the background application, etc. Other information recorded in the event records by the example logger 220 may include, for example, a panelist identification, a device identification, and/or a special event type. The example logger 220 generates event records in the log file containing the identified information.

The application event monitor 205 detects special events that take place before, during, or after the monitoring period at block 505. For example, such special events may be an opening of a metered application, a closing of the metered application, a change in context of the metered application, an audio output event of the metered application, and/or a power event associated with the consumer device 110 running the metered application. The opening or closing of the metered application may be detected by the example application event monitor 205 via system threads, CPU usage, and/or system memory usage.

At block 530, the example logger 220 stores the generated event record(s) in a log file. The log file may be an extensible markup language (XML) file, a comma separated values (CSV) file, a common (or extended) log format (CLF/ELF) file, a text file, and/or any type of file format capable of storing logged information recognizable to one of ordinary skill in the art. The program of FIG. 5 ends or returns to block 505. For example, control may return to block 505 where the example application event monitor 205 will continue monitoring metered applications for special events and bandwidth usage. In other examples, at the culmination of the example program 500 (block 530), the example logger 220 may transmit the log file to the audience measurement entity 117. As discussed above, the log file may be transmitted to, or obtained by, an example audience measurement entity 117 or, more specifically, the example crediting engine 115 of the example audience measurement entity 117.

FIG. 6 is a flowchart representative of example machine-readable instructions 600 that may be executed to implement the example crediting engine 115 of FIG. 4. The program 600 begins at block 605 when the example fetcher 405 obtains a log file for crediting. In the illustrated example, the example fetcher 405 retrieves the log file from the example consumer device 110 via the example network 120 of example FIG. 1. When the example fetcher 405 obtains the log file for crediting, the example fetcher 405 separates the log file by application. For example, the example fetcher 405 reorders the event records in the log file by application and by timestamp. The reordering of the event records creates a time ordered listing of application event records. The example fetcher 405 then transmits the log file to the example creditor 410 via the data bus 402. Control proceeds to block 610.

At block 610, the example creditor 410 loads an event record from the log file. In the illustrated example, the example creditor 410 processes the log file for each application beginning with the earliest timestamp event record. The example creditor 410 looks for the earliest event record indicating the application is active in order to discard artifact or faulty event records that may exist in the log file. For example, the first two entries in a log file may be power off events denoting application inactivity. Because there are no preceding application active events, these two example event records have no preceding application active events, these two example event records are not useful to the example creditor 410 for crediting an application with usage durations (e.g., because no duration is evident or determinable).

At block 615, the example creditor 410 examines the loaded event record to determine the context of the event contained in the event record. The example creditor 410 determines if the event record was logged while the corresponding application was in the foreground or the background of the example consumer device 110. If the loaded event record is determined by the example creditor 410 as a foreground event record, control proceeds to block 620. However, if the example creditor 410 determines that the event record is a background event record, control proceeds to block 630.

At block 620, the example creditor 410 assigns a foreground start flag to the loaded event record. The foreground start credit is added to the event record in the data file by the example creditor 410. In other examples, the example creditor 410 may extract the event record from the log file to manipulate the event record by adding a start or stop flag. In some examples, the example creditor 410 may save the timestamp associated with the event record. When the example creditor 410 has added the foreground start flag, control proceeds to block 625.

At block 625, the example creditor 410 enters the foreground crediting process. The example creditor 410 iterates over the application event records in the log file sequentially until a foreground inactive event record is identified. As explained in further detail in conjunction with FIG. 7, during foreground crediting, when the next foreground inactive event record is identified, the example creditor 410 adds a foreground stop flag to the foreground inactive event record.

Moving to block 630, the example creditor 410 assigns a background start flag to the loaded event record. The example creditor 410 also generates and or assigns a temporal activity window to the event loaded event record for use in background crediting of spiked bandwidth pattern applications. Of course, if the bandwidth usage pattern is determined to not be spiked the temporal activity window may be ignored. The background start credit is added to the event record in the log file by the example creditor 410. In other examples, the example creditor 410 extracts the event record from the log file to append a start or stop flag. When the example creditor 410 has assigned the background start flag, control proceeds to block 635.

At block 635, the example creditor 410 enters the background crediting process. The background crediting process is explained in further detail below in FIG. 8. The example creditor 410 processes the log file and assigns a background stop flag to an event record dependent upon the bandwidth usage pattern of the application (e.g., the example first and/or second applications 125, 126). When the background stop flag has been assigned to the event record, control proceeds to block 640.

At block 640, after the context start and stop flags have been assigned to corresponding event records, the example creditor 410 calculates the duration for usage. Using the timestamp in the event record associated with the start flag and the timestamp in the event record associated with the end flag, the example creditor 410 determines the span of time between these flags. For example, the timestamp of the start flag is subtracted from the timestamp of the end flag and the result is determined to be the duration of usage for that particular session of usage. After the activity duration has been calculated, control proceeds to block 645.

At block 645, the example creditor 410 assigns the calculated activity duration to the associated application and/or the associated panelist. Once the application activity duration has been calculated at block 640, the example creditor 410 determines the correct application and/or panelist to credit with the duration of usage. The duration of usage is credited to the application and stored in the example application credit database 420. The event records associated with the credited duration of usage are marked as processed in the log file (or deleted) so that they are not reprocessed in subsequent iterations of the example program 600. Control proceeds to block 650.

At block 650, the example creditor 410 determines if any event records remain unprocessed in the log file. If there are remaining unprocessed event records in the log file, control proceeds to block 610. If there are no remaining unprocessed records in the log file, the example program 600 terminates or suspends until a new log file is available.

FIG. 7 is a flowchart representative of example machine-readable instructions 700 that may be executed to implement the example foreground crediting process 625 of FIG. 6. The instructions 700 begin at block 705 when the example creditor 410 has assigned a foreground start flag to a loaded event record.

At block 705, the example creditor 410 loads the next event record associated with the application to which the foreground start flag was assigned in block 620 of FIG. 6. At block 710, the example creditor 410 accesses the event record loaded in block 705 to determine if the event record denotes that the application went inactive. If the event record loaded at block 705 and processed by the example creditor 410 does not indicate application inactivity, control returns to block 705. However, if the event record loaded at block 705 does denote application inactivity, control proceeds to block 715. At block 715, a foreground stop flag is assigned to the event record loaded at block 705. After the foreground stop flag is assigned, the example instructions 700 terminate.

FIG. 8 is a flowchart representative of example machine-readable instructions 800 that may be executed to implement the example background crediting process 635 of FIG. 6. The instructions 800 begin at block 805 when the example creditor 410 has assigned a background start flag to a loaded event record.

At block 805, the example creditor 410 determines the bandwidth usage pattern of the application associated with the event record loaded at block 610. For example, the example creditor 410 determines if the bandwidth usage pattern is spiked, (e.g., as seen with the Pandora™ application) or continuous (e.g., as seen with the ESPN Radio™ application). In the illustrated example, the example creditor 410 accesses the event record to determine the bandwidth usage pattern (e.g., because the bandwidth usage pattern of the application was recorded in the log file). In other examples (e.g., where the bandwidth usage pattern is missing and/or not recorded in the event record of the log file), the example creditor 410 may reference a table containing applications and associated bandwidth usage patterns. If the example creditor 410 determines that the bandwidth usage pattern is continuous, control proceeds to block 810.

At block 810, the example creditor 410 loads the next event record associated with the application assigned the background start flag in block 630 of FIG. 6. At block 815, the example creditor 410 processes the event record loaded in block 810 to determine if the event record the application was inactive in the background. If the event record loaded at block 810 and processed by the example creditor 410 does not indicate application inactivity, control returns to block 810. However, if the event record loaded at block 810 does denote application inactivity, control proceeds to block 835.

Returning to block 805, if the example creditor 410 determines that the bandwidth usage pattern of the loaded event record is spiked, control proceeds to block 820.

At block 820 the example creditor 410 loads the next event record associated with the application assigned the background start flag in block 630 of FIG. 6. The example creditor 410 determines if the event record was logged as a special event indicating the application was inactive and/or cessation of background context of the application (e.g., power-down, context change to foreground, etc.) (block 825). If the event record is associated with a special event indicating inactivity and/or the end of background context, then a background end flag is generated and assigned to the event record (block 835). However, if the event record is not associated with a special event indicating inactivity and/or the end of background usage, control proceeds to block 827.

The example creditor 410 then determines if the event record indicates the application was active (block 827). If the event record indicates that the application was inactive, a next record is accessed (block 820).

If the next accessed event record indicates the application was active, the timestamp of the event record is checked against the temporal activity window established in block 630 of example FIG. 6 (block 830). In the illustrated example, the example creditor 410 compares the timestamp of the event record having the background start flag against the timestamp of the event record loaded at block 820. Here, a temporal activity window (e.g., temporal activity window(s) 312, 313) is established by the example creditor 410 similar to the example illustration of FIG. 3A. For example, the temporal activity window 312, 313 of three minutes is applied to the background start credit from block 630 of FIG. 6. If no event record indicating the application was active is detected beyond the three minutes from the timestamp of the event record loaded at block 630 of FIG. 6, then the example creditor 410 determines that the temporal activity window has been exceeded. In this instance, a background stop flag will be generated (or added to the event record in some instances) at the end of the temporal activity window (e.g., three minutes from the timestamp of the event record loaded at block 630 of FIG. 6). If the temporal activity window has not been exceeded, control returns to block 820 and the temporal activity window is reset to the timestamp of the next event record loaded at block 820.

However, if the temporal activity window has been exceeded, then control proceeds to block 835. In some examples, network activity event records may go unrecorded or may be logged incompletely with respect to downloaded or spiky bandwidth patterned applications. An advantage created by using block 830 is that the instruction provides a failsafe to incomplete log records resulting in infinite or unrealistically long duration credits. At block 835, a background stop flag is assigned to the event record loaded at either block 810 or block 820. After the background stop flag is assigned at block 835, the example instructions 800 terminate (e.g., control returns to block 640 of FIG. 6).

Figure 9:
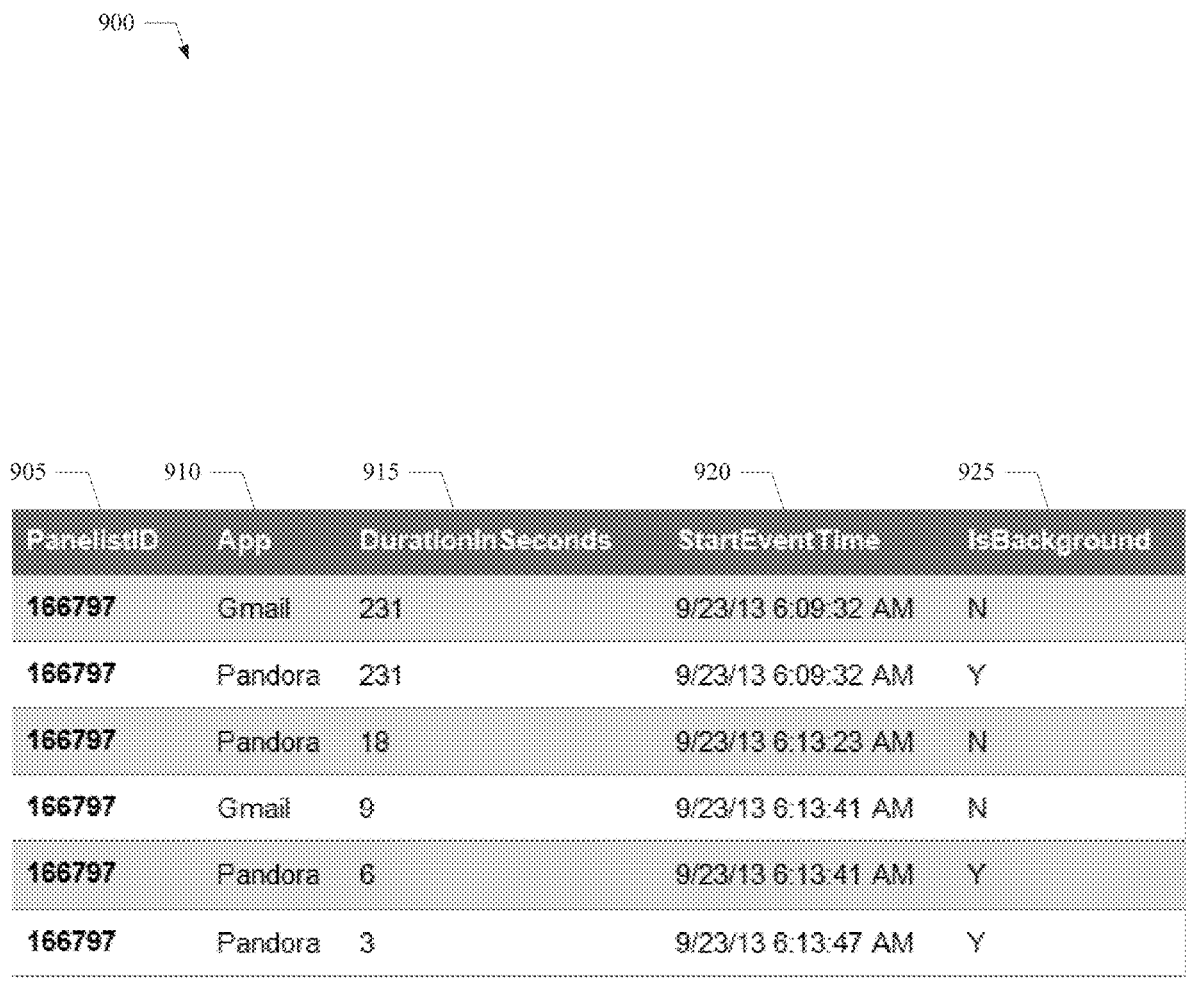
FIG. 9 illustrates example credits generated by the example crediting engine of FIG. 1.

FIG. 9 is a table of example credits 900 produced by the example crediting engine 115 of FIGS. 1 and 4 and stored in the application credit database 420. After processing the log file and assigning credits to the applications in the log file, the table 900 may be generated. The example table 900 includes a panelist identification (PanelistID) 905, an application identification (App) 910, a time duration (DurationInSeconds), a starting timestamp (StartEventTime), and a background designation (IsBackground). The panelist ID 905 is a field containing an identification of the panelist associated with the consumer device 110 from which the credits are generated. The application identification 910 is a field containing the application (or media) receiving the credit. The time duration 915 is the time credited to the application 910. The starting timestamp 920 is the time at which the application was first metered to be active. The background designation 925 indicates whether the time duration 915 occurred while the application 910 executed in the background.

However, such credits are not necessarily kept in the illustrated fashion. In fact, the credits may be kept in any number of suitable ways. For example, the credits may be kept in a database at the example audience measurement entity 117 or the credits may be stored in a storage medium in any number of file formats such as tables, text, or images.

Returning to the example credits 900, the example panelist 905 associated with the consumer device 110 may be recorded. For example, when a panelist is registered in a metered device panel, an identifier is assigned to the panelist. In the illustrated example, the panelists are identified by a number. The example application 910 may be recorded as well. The duration in seconds 915 represents the duration calculated between the start flag assigned to the foreground or background event record (e.g., blocks 620 and/or 630 of FIG. 6) and the event record assigned the end flag (e.g., block 715 of FIG. 7 and/or block 835 of FIG. 8). The start event time 920 is representative of the timestamp associated with the event record assigned the start flag (e.g., blocks 620 and/or 630 of FIG. 6). The IsBackground data field 925 is representative of where the application credit occurred. For example, the field may be populated with a yes (or positive) indication when the application was active in the background and may be populated with a no (or negative) indication if the application was in the foreground. It will be appreciated that the credits table 900 may be customized for display using the wealth of information gathered by the example meter 130 and/or the example crediting engine 115 and the example depiction of the example credits 900 of FIG. 9 serve to provide a helpful illustration of one example set of credits generated by the example crediting engine 115.

Figure 10:
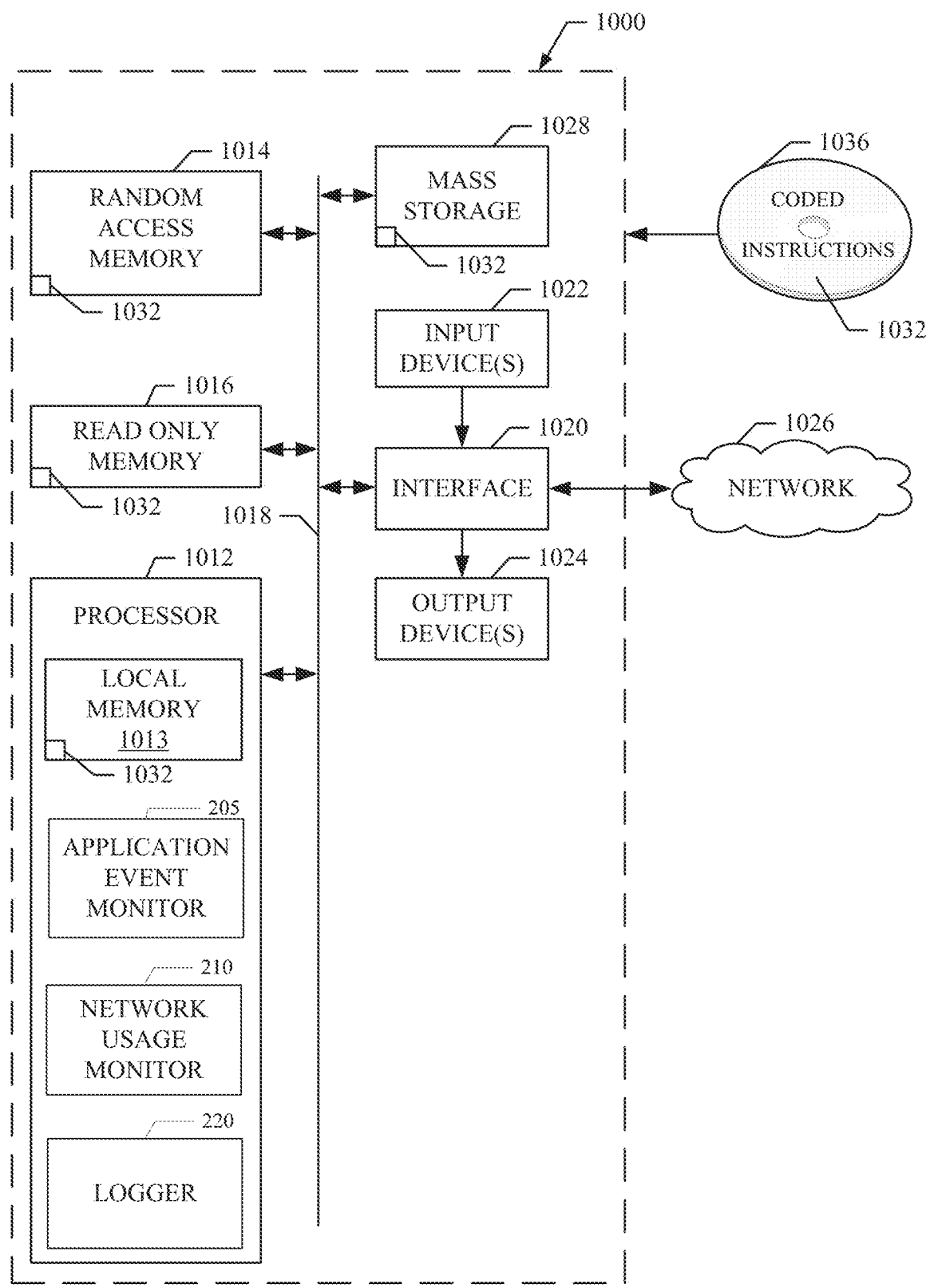
FIG. 10 is a block diagram of an example processor system that may execute any of the machine readable instructions represented by FIG. 5 to implement the example meter of FIGS. 1 and 2.

FIG. 10 is a block diagram of an example processor platform 1000 structured to execute the instructions of FIG. 5 to implement the example meter 130 of FIGS. 1 and/or 2. The processor platform 1000 can be, for example, a server, a personal computer, a mobile device (e.g., a cell phone, a smart phone, a tablet such as an iPad™), a personal digital assistant (PDA), an Internet appliance, a gaming console, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors or controllers from any desired family or manufacturer.

The processor 1012 of the illustrated example includes a local memory 1013 (e.g., a cache). The processor 1012 implements the example application event monitor 205, the example network usage monitor 210, and the example logger 220 by executing the instructions represented in FIG. 5. The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), and/or a PCI express interface.

In the illustrated example, one or more input devices 1022 are connected to the interface circuit 1020. The input device(s) 1022 permit a user to enter data and commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), and/or speakers). The interface circuit 1020 of the illustrated example, thus, typically includes a graphics driver card.

The interface circuit 1020 of the illustrated example also includes a communication device such as a transmitter, a receiver, a transceiver, a modem and/or network interface card to facilitate exchange of data with external machines (e.g., computing devices of any kind) via a network 1026 (e.g., an Ethernet connection, a digital subscriber line (DSL), a telephone line, coaxial cable, a cellular telephone system, etc.).

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, RAID systems, and digital versatile disk (DVD) drives.

The processor platform 1000 of the illustrated example also includes the example application event monitor 205, the example network usage monitor 210, and the example logger 220.

The coded instructions 1032 of FIG. 5 may be stored in the mass storage device 1028, in the volatile memory 1014, in the non-volatile memory 1016, and/or on a removable tangible computer readable storage medium such as a CD or DVD 1036.

Figure 11:
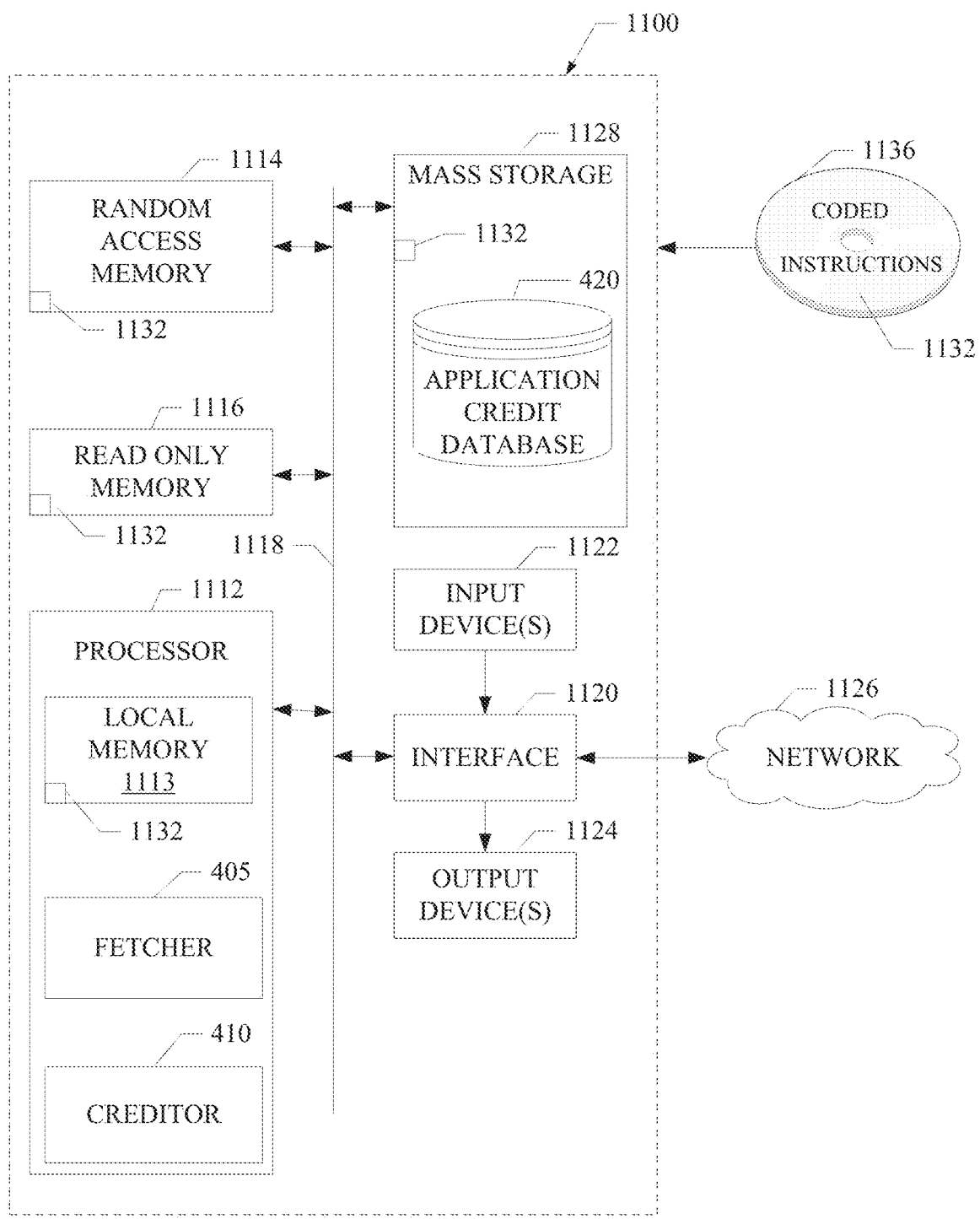
FIG. 11 is a block diagram of an example processor system structured to execute any of the machine readable instructions represented by FIGS. 6, 7, and 8 to implement the example crediting engine of FIGS. 1 and 4.

FIG. 11 is a block diagram of an example processor platform 1100 structured to execute the instructions of FIGS. 6, 7, and 8 to implement the example crediting engine 115 of FIGS. 1 and/or 4. The processor platform 1000 can be, for example, a server, a personal computer, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor executes the instructions of FIGS. 6, 7 and 8 to implement the example fetcher 405 and the example creditor 410. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), and/or speakers). The interface circuit 1120 of the illustrated example, thus, typically includes a graphics driver card.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 6, 7, and 8 may be stored in the mass storage device 1128, in the volatile memory 1114, in the non-volatile memory 1116, and/or on a removable tangible computer readable storage medium such as a CD or DVD 1136. The mass storage device 1128 also includes the application credit database 420.

From the foregoing, it will be appreciated that methods, apparatus and articles of manufacture have been described to credit applications executing in the background of a consumer device. Not only do the methods, apparatus and articles of manufacture allow for crediting background applications, they also improve the function of a metered device. Using bandwidth patterns for crediting of background applications improves the operation of the metered consumer device by alleviating excessive queries to applications for activity status. For example, thousands of potential query operations to determine activity status every minute may be eliminated. This improvement frees up processing resources and system memory, and improves power consumption. Additionally, avoiding impeding the execution of the metered applications by repeatedly querying for status reduces the likelihood of interference with the operation of those applications and improves operation of the system in which the metered applications executes by releasing the operation overhead associated with the status requests.

Further, examples disclosed herein facilitate concurrent metering, whereby two or more concurrently executing applications (e.g., one or more applications in the foreground and one or more applications in the background) may be credited. In the past, only the application in the foreground has been acknowledged as being active and, thus, credited with an exposure to an audience. The examples disclosed herein further the art of audience measurement by allowing background applications and/or the media presented by the background application to be credited with audience exposure(s). Examples disclosed herein allow background applications to execute without interruption from repeated meter queries because the monitoring of bandwidth usage does not require the background application to be accessed or otherwise interrupted.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. An apparatus comprising:
   means for comparing bandwidth usage of an application executing in a background of a device to a threshold to determine a state of the application as one of active or inactive, the threshold based on a bandwidth usage pattern of the application;
   means for logging event records associated with the application, the event records including the state of the application; and
   means for crediting a duration of background execution of the application, the means for crediting to:
      determine whether the bandwidth usage pattern is spiked or continuous based on a first event record representative of background execution of the application being started;
      access a second event record associated with the application;
      update the second event record to be representative of the background execution of the application being stopped when the bandwidth usage pattern is spiked and a timestamp of the second event record exceeds a temporal activity window; and
      determine the duration of the background execution of the application based on the first event record and the second event record.

2. The apparatus of claim 1, wherein the means for crediting is to update the second event record to be representative of the background execution of the application being stopped when the bandwidth usage pattern is continuous and the second event record associated with the application indicates application inactivity.

3. The apparatus of claim 1, wherein the means for crediting is to reference a table listing applications and associated bandwidth usage patterns when information indicating whether the bandwidth usage pattern is spiked or continuous is not included in the first event record.

4. The apparatus of claim 1, wherein the means for comparing is to:
   identify the bandwidth usage pattern as spiked when data processed by the application is downloaded in increments for future presentation to a user; and
   identify the bandwidth usage pattern as continuous when the data processed by the application is downloaded continuously while the application is presenting to the user in real-time.

5. The apparatus of claim 1, wherein the means for comparing is to use the temporal activity window to determine whether the application is active during a time period when the bandwidth usage of the application is below the threshold, the temporal activity window to occur after the time period.

6. The apparatus of claim 1, wherein when the timestamp of the second event record exceeds the temporal activity window, the means for crediting is to update the second event record to indicate the background execution of the application stopped at an end of the temporal activity window.

7. The apparatus of claim 1, wherein when the timestamp of the second event record does not exceed the temporal activity window, the means for crediting is to reset the temporal activity window to a timestamp of a subsequent third event record associated with the application.

8. The apparatus of claim 7, wherein when the bandwidth usage pattern is spiked and the timestamp of the second event record does not exceed the temporal activity window, the means for crediting is to iterate through subsequent ones of the event records associated with the application until a timestamp of a first one of the subsequent ones of the event records exceeds the temporal activity window.

9. An audience measurement apparatus to monitor panelist media exposure, the apparatus comprising:
   means for comparing bandwidth usage of a first media presentation application executing in a background of a consumer device to a first threshold for bandwidth activity associated with the first media presentation application to determine a state of the first media presentation application during a first time period as one of active or inactive, the first threshold based on a first bandwidth usage pattern of the first media presentation application, wherein to compare the bandwidth usage to the first threshold for bandwidth activity, the means for comparing to:
      detect a first period during which the bandwidth usage is above the first threshold for bandwidth activity;
      detect a second period during which the bandwidth usage is below the first threshold for bandwidth activity;
      determine that the first media presentation application is active during the second period when the bandwidth usage exceeds the first threshold during a temporal activity window after the first period; and
      determine that the first media presentation application is inactive after the second period when the bandwidth usage does not exceed the first threshold during the temporal activity window after the first period;
   means for determining a state of a second media presentation application executing in a foreground of the consumer device during the first time period as one of active or inactive based on whether a special event associated with the second media presentation application is detected during the first time period; and
   means for logging application event information including an identification of the first media presentation application, an identification of the second media presentation application, a context of the first media presentation application, a context of the second media presentation application, the state of the first media presentation application and the state of the second media presentation application.

10. The apparatus according to claim 9, wherein the special event associated with the second media presentation application corresponds to at least one of an output by the second media presentation application, a change of location of the second media presentation application, an opening of the second media presentation application or a closing of the second media presentation application.

11. The apparatus according to claim 9, wherein the means for determining is further to determine the state of the first media presentation application executing in the background of the consumer device during the first time period as one of active or inactive based on whether a special event associated with the first media presentation application is detected during the first time period.

12. The apparatus according to claim 11, wherein the special event associated with the first media presentation application corresponds to at least one of an output by the first media presentation application, a change of location of the first media presentation application, an opening of the first media presentation application or a closing of the first media presentation application.

13. The apparatus according to claim 1, wherein the audience measurement apparatus is further to transmit the application event information to an audience measurement entity.

14. An audience measurement apparatus to monitor panelist media exposure, the apparatus comprising:
  means for monitoring media presentation applications, the means for monitoring to:
    set a first threshold for bandwidth activity associated with a first media presentation application executing in a background of a consumer device based on a first bandwidth usage pattern of the first media presentation application, wherein the first threshold is different from a second threshold associated with a second application; and
    compare a bandwidth usage of the first media presentation application executing in the background to the first threshold for bandwidth activity associated with the first media presentation application to determine a state of the first media presentation application executing in the background as one of active or inactive; and
  means for generating a measurement of media exposure including panelist identification data, an identification of the first media presentation application, a timestamp, and the state of the first media presentation application.

15. The apparatus according to claim 14, further including means for detecting that a special event, which is associated with the first media presentation application executing in the background, has occurred.

16. The apparatus according to claim 15, wherein the special event includes at least one of an output by the first media presentation application, a change of location of the first media presentation application, an opening of the first media presentation application or a closing of the first media presentation application.

17. The apparatus according to claim 16, wherein the special event designates activity or inactivity.

18. The apparatus according to claim 16, wherein the means for generating is further to transmit the measurement of media exposure to an audience measurement entity.

19. The apparatus according to claim 14, wherein the means for monitoring is further to, in response to the bandwidth usage pattern being identified as peaked, detect a first period during which the bandwidth usage is above the first threshold for bandwidth activity and detect a second period during which the bandwidth usage is below the first threshold for bandwidth activity.

20. The apparatus of claim 19, wherein the means for monitoring is further to determine that the first media presentation application is active during the second period when the bandwidth usage exceeds the first threshold within a temporal activity window after the first period and determine that the first media presentation application is inactive after the second period when the bandwidth usage does not exceed the first threshold within the temporal activity window after the first period.

\* \* \* \* \*